US012807360B2

(12) United States Patent
Desai et al.

(10) Patent No.: US 12,807,360 B2
(45) Date of Patent: Nov. 24, 2026

(54) METHODS AND APPARATUSES FOR DETECTING ANOMALIES WHEN FILLING A CONTAINER WITH FLUID

(71) Applicant: ELI LILLY AND COMPANY, Indianapolis, IN (US)

(72) Inventors: Hetalkumar Meghrajbhai Desai, Greenwood, IN (US); Matthew Glenn Kawiecki, Fort Wayne, IN (US); Rakesh Sharma, Haryana (IN); Asit Tiwari, West Bengal (IN); Jordan Matthew Venderley, Rosharon, TX (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 223 days.

(21) Appl. No.: 18/598,084

(22) PCT Filed: Sep. 19, 2022

(86) PCT No.: PCT/US2022/043937
§ 371 (c)(1),
(2) Date: Mar. 7, 2024

(87) PCT Pub. No.: WO2023/044089
PCT Pub. Date: Mar. 23, 2023

(65) Prior Publication Data

US 2025/0223069 A1 Jul. 10, 2025

Related U.S. Application Data

(60) Provisional application No. 63/261,372, filed on Sep. 20, 2021.

(51) Int. Cl.
*B65B 57/14* (2006.01)
*B65B 3/00* (2006.01)
(Continued)

(52) U.S. Cl.
CPC ............ *B65B 57/145* (2013.01); *B65B 3/003* (2013.01); *B65B 57/18* (2013.01); *G06T 7/0002* (2013.01);
(Continued)

(58) Field of Classification Search
CPC ....... B65B 57/145; B65B 3/003; B65B 57/18; G06T 7/0002; G06T 7/13;
(Continued)

(56) References Cited

U.S. PATENT DOCUMENTS 5,427,161 A 6/1995 Luhmann et al.
8,701,719 B2 4/2014 Clusserath
(Continued)

FOREIGN PATENT DOCUMENTS

CN 110405788 A 11/2019
CN 111568244 A 8/2020
(Continued)

OTHER PUBLICATIONS

Patent Cooperation Treaty International Search Report of the International Searching Authority pertaining to International Application No. PCT/US2022/043937 International Filing Date: Sep. 19, 2022 Date of Mailing: Mar. 23, 2023.
(Continued)

*Primary Examiner* — Jennifer Mehmood
*Assistant Examiner* — Vaisali Rao Koppolu
(74) *Attorney, Agent, or Firm* — Arthur Shum

(57) ABSTRACT

The techniques described herein relate to computerized methods and apparatuses for detecting anomalies within a container using one or more images of a video of a filling process in which the container is filled with liquid. The techniques described herein further relate to computerized methods and apparatuses for detecting the anomalies in real-time while the container is filled with fluid, and upon
(Continued)

detecting at least one anomaly, outputting an alert, or altering one or more parameters of the filling process the filling machine is configured to perform.

23 Claims, 17 Drawing Sheets

(51) Int. Cl.

| | |
|---|---|
| ***B65B 57/18*** | (2006.01) |
| ***G06T 7/00*** | (2017.01) |
| ***G06T 7/13*** | (2017.01) |
| ***G06V 10/26*** | (2022.01) |
| ***G06V 10/75*** | (2022.01) |
| ***G06V 10/764*** | (2022.01) |
| ***G06V 10/774*** | (2022.01) |
| ***G06V 10/82*** | (2022.01) |
| ***G06V 20/40*** | (2022.01) |

(52) U.S. Cl.

CPC ................ *G06T 7/13* (2017.01); *G06V 10/26* (2022.01); *G06V 10/75* (2022.01); *G06V 10/764* (2022.01); *G06V 10/774* (2022.01); *G06V 10/82* (2022.01); *G06V 20/41* (2022.01); *G06T 2207/10016* (2013.01); *G06T 2207/20081* (2013.01); *G06T 2207/20084* (2013.01)

(58) Field of Classification Search

CPC . G06T 2207/10016; G06T 2207/20081; G06T 2207/20084; G06T 2207/20092; G06T 7/0004; G06V 10/26; G06V 10/75; G06V 10/764; G06V 10/774; G06V 10/82; G06V 20/41; G06V 10/443; G01N 2021/8883; G01N 2021/8887; G01N 2201/1296; G01N 21/9027

See application file for complete search history.

(56) References Cited

U.S. PATENT DOCUMENTS

| | | | | |
|---|---|---|---|---|
| 9,506,903 | B2 | 11/2016 | Guthrie et al. | |
| 9,579,255 | B2 | 2/2017 | Eliuk et al. | |
| 2009/0178728 | A1 | 7/2009 | Cochran et al. | |
| 2012/0060966 | A1 | 3/2012 | Ranalletta et al. | |
| 2016/0073063 | A1 | 3/2016 | Peret et al. | |
| 2020/0057880 | A1 | 2/2020 | Mizutani et al. | |
| 2020/0126210 | A1 * | 4/2020 | Li | G06F 16/532 |
| 2020/0132534 | A1 | 4/2020 | Luedemann | |
| 2020/0231426 | A1 * | 7/2020 | Edwards | B67D 1/0888 |
| 2020/0293796 | A1 | 9/2020 | Sajjadi Mohammadabadi et al. | |
| 2020/0339295 | A1 | 10/2020 | Christopher | |
| 2021/0049752 | A1 | 2/2021 | Weinstein et al. | |
| 2021/0375115 | A1 * | 12/2021 | Roy | G08B 27/005 |
| 2023/0196096 | A1 * | 6/2023 | Milne | G06N 3/09 706/25 |

FOREIGN PATENT DOCUMENTS

| | | | |
|---|---|---|---|
| JP | 2013255728 | A | 12/2013 |
| JP | 2016536079 | A | 11/2016 |
| WO | 2015029018 | A1 | 3/2015 |
| WO | 2019048051 | A1 | 3/2019 |

OTHER PUBLICATIONS

Patent Cooperation Treaty Written Opinion of the International Searching Authority pertaining to International Application No. PCT/US2022/043937 International Filing Date: Sep. 19, 2022 Date of Mailing: Mar. 23, 2023.

* cited by examiner

METHODS AND APPARATUSES FOR DETECTING ANOMALIES WHEN FILLING A CONTAINER WITH FLUID

BACKGROUND

Automated techniques can be used to fill a container with a solution. For example, on an assembly line for manufacturing liquid drug products, glass vials can be filled using a needle that injects the drug product into the vials. In some implementations, the needle is inserted almost all the way into the vial, and liquid drug is pumped out into the vial. As the vial fills up, the needle is retracted out of the vial. Different types of "bad" fills may occur during the filling process. For example, as the liquid drug is pumped out of the needle, it can splash high enough to leave traces of the drug product on the needle. In this case, the vial being filled is underdosed. These traces may later drop into another vial being filled, causing the other vial to be overdosed. These defects may be detected by a quality control review process that occurs after the filling process. At that time, the source of the traces from anomalies occurred during the filling process may not be timely identified, causing the filled vials to be discarded.

SUMMARY

The present disclosure relates to techniques for detecting anomalies when filling a container with fluid. The techniques provide a computerized method for detecting an anomaly in a filling process in which a container is filled with a fluid using a filling component. The method may include capturing a video of the container while the container is being filled with the fluid through the filling component; analyzing an image of the video using one or more processors to detect the anomaly, wherein the anomaly comprises one or more of filling component submersion, splash within the container, drip within the container, or an unsafe filling component-fluid distance in the container; and generating an alert indicative of the detected anomaly.

The method may further include tuning a filling machine that filled the container with the fluid by altering, based on the detected anomaly, one or more parameters of the filling process that the filling machine is configured to perform. The method may also detect anomalies in a filling process at video level. For example, the method may include analyzing additional images of the video; and determining the filling process has a filling component submersion anomaly if any of the image or the additional images is determined to show a filling component submersion anomaly; determining the filling process has a splash anomaly if any of the image or the additional images is determined to show a splash anomaly; or determining the filling process has an unsafe filling component-fluid distance if: (1) none of the image or the additional images is determined to show filling component submersion; and (2) at least one of the image or the additional images is determined to show a minimal vertical distance between the filling component and the fluid being less than a threshold distance.

Various anomalies may be detected during the filling process. In an embodiment, the techniques provide a computerized method for detecting any of a filling component submersion, splash within container, or risk of unsafe filling component-fluid distance anomaly using an image of a filling process. The method may include identifying the filling component in the image; identifying the fluid in the container in the image; and detecting the anomaly based on a relative position between the filling component and the fluid and/or a comparison of the width of the filling component and the width of the fluid.

In an embodiment, the techniques provide a computerized method for detecting splash within container based on fluid property near the filling component, where the fluid property is a rise in the surface of the fluid. In an embodiment, the techniques provide a computerized method for detecting a risk of unsafe filling component-fluid distance when the filling process is nearing completion. If an image being analyzed corresponds to a point in time when the filling process is nearing completion, the method may detect one or more anomalies by identifying the filling component in the image; identifying the fluid in the container in the image; determining a distance between the filling component and the fluid; and detecting an unsafe filling component-fluid distance if it is determined that a distance between the filling component and the fluid is below a threshold distance.

In an embodiment, the techniques provide a computerized method for detecting a drip using an image/video of a filling process using a machine learning model. The method includes providing the image or any of the additional images in the video to a trained machine learning model; using the trained machine learning model to determine one of a plurality of classifications, wherein at least one of the plurality of classifications is indicative of a drip in the image or any of the additional images. The method may also include training the machine learning model by: obtaining a plurality of training videos and training a neural network model using the plurality of training videos. Each of the plurality of training videos may capture an associated fluid filling process and include a plurality of training images each labeled with one of the plurality of classifications.

BRIEF DESCRIPTION OF THE DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

DETAILED DESCRIPTION

Figure 1:
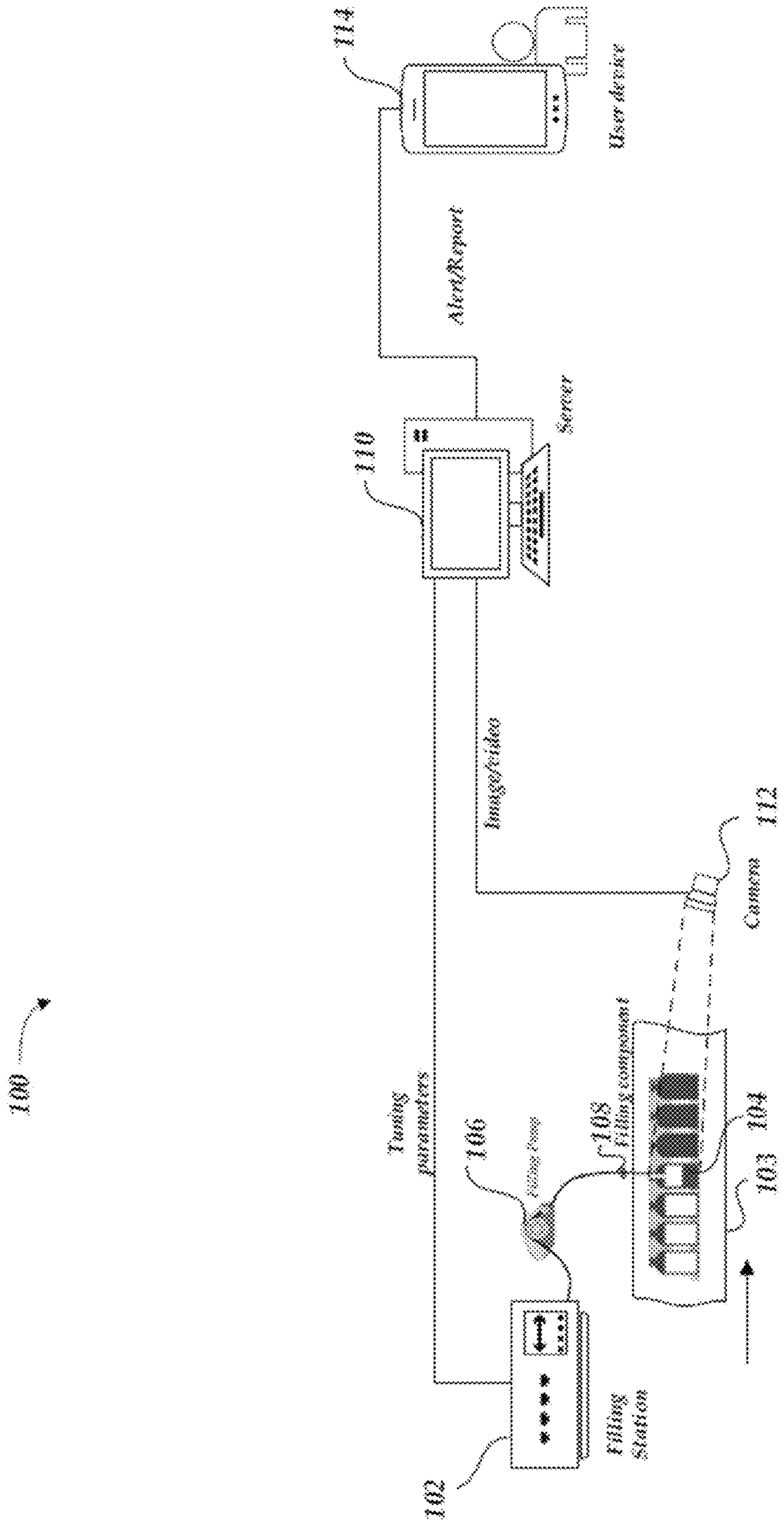
FIG. 1 is a diagram of a system for detecting anomalies while filling a container with liquid, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

During a filling process for filling a container with liquid, a filling component (e.g., a needle or other component) is inserted into the container, such as a glass vial, to fill the container with liquid product, such as a pharmaceutical fluid and/or other types of fluids. For example, a filling machine can be configured to insert the filling component into the container (e.g., most of the way into the container), and pump a liquid out into the container. As the container is filled up with liquid, the filling component is retracted out of the container accordingly (e.g., as the fluid level rises in the container). Once filled, a plunger can be inserted into the container to seal the container.

Various types of anomalies can occur during the filling process. For example, as a liquid is pumped out of the filling component into a container, it may splash high enough to leave traces of the liquid product on the filling component. In another example, if the filling component is submerged into the fluid being filled, traces of the liquid may also be left on the filling component. If this is not detected and corrective measures are not taken in a timely way, it can result in the containers filled using the filling process needing to later be discarded. In a drug context, where a needle is used to fill a vial with fluid, for example, traces of fluid being left on the needle may cause the vial being filled to be underdosed. These traces may later drop into another vial being filled, causing the other vial to be overdosed. Under quality control protocols, containers with such defects may have to be discarded.

Another example of a filling anomaly is when a liquid is pumped out of the filling component, it may splash high enough to leave a drop on the side of the container. When a plunger or stopper is later inserted into the filled container, this drop may be trapped between the side of the plunger/stopper and the container. If this anomaly is not timely detected, it can result in the container being discarded at a later time. For example, under a qualify control inspection, if a drop of drug product is spotted between the side of the plunger/stopper and the container, the container may need to be discarded because the manufacturer may not be able to determine if that drop occurred due to a splash during filling, or because the plunger/stopper is not sealed correctly and is therefore defective (thus risking a compromised product).

The inventors have recognized and appreciated that conventional filling systems are unable to detect anomalies in real-time while a container is being filled. In such systems, the containers on a filling assembly line may undergo a quality control inspection after they are filled with liquid and moved out of the filling station. At that time, the filling process is complete, and therefore the filling components are retracted from the containers and the containers are often sealed with a plunger or stopper. As discussed previously, anomalies that occur during the filling process (e.g., the liquid splashing onto the container and/or filling component) often result in the containers being discarded because artifacts left from anomalies in the filling process cannot be properly identified after the filling process is completed. If the anomalies that occur during the filling process are not detected in a timely way, the filling process will continue uncorrected, until inspection that may occur at a much later stage, potentially causing an entire batch of containers filled over a long period of time to be wasted and/or discarded.

To solve the various technical problems discussed in the present disclosure, the inventors have recognized and appreciated that detecting anomalies that occur inside a container may be useful not only in detecting anomalies in the lab environment but also in the production environment.

The inventors have recognized and appreciated that conventional container filling systems also do not provide any way to automatically tune the filling process in response to filling anomalies. Instead, human monitoring and control is often used to determine and develop a filling profile. A filling profile may include a set of parameters governing how a filling machine fills containers in a filling process. Exemplary parameters include rate at which fluid is pumped, movement and/or speed of filling component, movement and/or speed of containers on assembly line, viscosity of fluid, and/or amount of fluid to be filled, etc. Automated monitoring and control can provide more consistency when developing a filling profile. Once these filling profiles are developed in the lab, the recommended parameters are sent to production. As such, any errors that cause the anomalies within containers are not timely detected or corrected. For example, errors in a filling process that systematically lead to bad fills may not be corrected or even detected before the contains are discarded. To solve these technical problems, the inventors have recognized and appreciated that detecting anomalies that occur inside a container may be useful not only in detecting anomalies early in the process but also in automatically tuning a filling process to avoid further anomalies. For example, the position of the filling component relative to the surface of the fluid in the container may give an indication as to whether an anomaly may occur. If the filling component is too close to the liquid being filled in, it may be an indication that a submersion of the filling component into the liquid may occur. If the filling component is too far from the liquid being filled in, it may be an indication that a splash within the container may occur. In another example, if a drip within a container is detected, it may indicate that the speed of the filling is too slow. All of these anomalies occurred within a container may be used to automatically tune a filling machine.

Accordingly, the inventors have developed new technologies to detect anomalies in a filling process in real-time using a video of the filling process while a container is being filled with liquid. Described herein are various techniques, including systems, computerized methods, and non-transitory instructions, that process high speed video of a filling process performed by a liquid filling station or assembly line. The system may analyze one or more images of the video to monitor for and/or detect an anomaly during the filling process. In response to detecting an anomaly, the system may output a signal or warning, or alter one or more parameters of the filling process the filling machine is configured to perform.

In some embodiments, a system may be provided to analyze one or more image frames of a video of a filling process to detect one or more anomalies in the filling process. In some examples used to describe the techniques herein, the system may include a filling machine configured to perform a filling process in which a container is filled with fluid using a filling component. The container may be transparent, such as a glass vial. The fluid may be fluid drug product, for example. The system may also include an image capturing device, such as a high-speed camera, configured to capture a video of the container while the container is being filled with fluid. The system may further include at least a processor configured to execute programming instructions to process the captured video by analyzing one or more images of the video, and to detect one or more anomalies in the filling process. Examples of an anomaly to be detected may include filling component submersion when the filling component is submerged into the liquid just being filled. An anomaly may also include a splash within the container, a drip within the container, or an unsafe filling component-fluid distance in the container. Once an anomaly is detected, the system may generate an alert indicative of the detected anomaly. The system may also tune the filling machine by altering, based on the detected anomaly, one or more parameters of the filling process that the filling machine is configured to perform to reach an optimal filling profile. For example, the system may predict optimal machine parameters based on the detected anomalies and automatically transmit the predicted machine parameters to the filling machine.

The inventors have also developed various embodiments in which the system may be configured to detect various anomalies within a container while the container is being filled. In some embodiments, the system may analyze one or more images in the video of a filling process to determine whether the filling process has an anomaly. For example, the system may determine that the filling process has a filling component submersion anomaly if any of the images in the video is determined to have a filling component submersion anomaly. In other examples, the system may determine the filling process has a splash anomaly if any of the images in the video is determined to show a splash anomaly, or if the number of images in the video that have a splash anomaly is greater than a threshold number. In other examples, the system may determine that the filling process has an unsafe filling component-fluid distance if at least one of the images in the video is determined to show an unsafe filling component-fluid distance. In other examples, the system may determine the filling process has a drip anomaly, if any of the images in the video is determined to show a drip anomaly. Embodiments in detecting the various types of anomalies are further described in the present disclosure.

In some embodiments, the system may identify the filling component in the image and identify the fluid in the container in the image. The identified filling component and the fluid may each be represented by a respective bounding box. The system may detect an anomaly based on a relative position between the filling component and the fluid. For example, the system may detect a filling component submersion anomaly if the bounding box of the filling component overlaps with the bounding box of the fluid, and the width of the bounding box of the fluid is larger than the width of the bounding box of the filling component by a threshold width difference. Additionally, and/or alternatively, the system may detect the filling component submersion anomaly in response to determining that the filling has started, for example, an elapsed time in the filling process is greater than a threshold filling time.

In some embodiments, the system may detect a splash within the container, if it is determined that the bounding box of the filling component overlaps with the bounding box of the fluid, and that the width of the bounding box of the fluid is not larger than the width of the bounding box of the filling component by a threshold width difference. In some embodiments, the system may detect a splash within the container if it is determined that (i) the bounding box of the filling component does not overlap with the bounding box of the fluid, (ii) a vertical distance between the filling component and the fluid is less than a threshold distance, and (iii) the width of the bounding box of the fluid is not larger than the width of the bounding box of the filling component by a threshold width difference. Additionally, and/or alternatively, the system may detect the splash anomaly in response to determining that the filling has just started, for example, an elapsed time in the filling process is less than a threshold filling time.

In some embodiments, the system may detect a splash within the container by checking a fluid property in an area around the filling component. In some examples, the area around the filling component may include a first area on one side of the filling component and a second area on the other side of the filling component. The first and second areas may be defined to be positioned vertically between the filling component and the fluid. The width of the first or second area may be a fixed width. Alternatively, the width of the first or second area may be proportional to the width of the filling component. Similarly, the height of the first or second area may be a fixed height, or may be proportional to the vertical distance between the filling component and the fluid. Thus, the system may detect a splash anomaly if at least one of the first or second areas shows a splash. In some embodiments, the fluid property may include a slope (or rise) in a surface of the fluid. Thus, the system may detect a splash in an area if it is determined that the slope in a surface of the fluid in the area exceeds a threshold. In some examples, the system may determine the slope in a surface of the fluid in an area based on surface edge pixels in the area. The surface edge pixels may be determined by applying an edge detector, e.g., Canny operator, to the area in the image in which the filling component and the fluid are identified.

In some embodiments, the system may determine the area around the filling component in response to determining that the filling component has been completely inserted into the container in a filling process. For example, the system may determine that the filling component has been completely inserted into the container if the variation of filling component width in a number of images in the video of the filling process is below a threshold variation. In some embodiments, the system may determine that the filling component has been fully inserted into the container in response to determining that the filling has started, for example, fluid is detected in the image being analyzed.

In some embodiments, the system may detect an unsafe filling component-fluid distance if it is determined that (i) the bounding box of the filling component does not overlap with the bounding box of the fluid, (ii) a vertical distance between the filling component and the fluid is less than a threshold distance, and (iii) the width of the bounding box of the fluid is larger than the width of the bounding box of the filling component by a threshold width. In other variations, the system may determine that an anomaly is unsafe filling component-fluid distance at a point in time when the filling process is nearing completion. In some examples, the system may determine a variation of height of the surface of the fluid in a number of consecutive images in the video. If the height variation of the fluid in the number of consecutive images is below a threshold, the system may determine that the filling process is nearing completion. Once it is determined that the filling process is nearing completion, the system may determine the distance between the filling component and the fluid. If the distance between the filling component and the fluid is below a lower threshold distance, the system may determine an unsafe filling component-fluid distance indicative that the distance between the filling component and the fluid is too low. If the distance between the filling component and the fluid is above a higher threshold distance, the system may determine an unsafe filling component-fluid distance indicative that the distance between the filling component and the fluid is too high. If the distance between the filling component and the fluid is between the lower threshold and the higher threshold distance, then the system may determine a safe filling component-fluid distance.

In some embodiments, the system may detect a drip within the container using a machine learning model. In some examples, the machine learning model may be configured to take an image in the video of a filling process as input, where the image contains a container and a filling component in the filling process. The machine learning model may be used to determine one of a plurality of classifications, wherein at least one of the plurality of classifications is indicative of a drip in the image. In some examples, the machine learning model may include a neural network model that can be trained over a training data set. In some embodiments, a training process may obtain a plurality of training videos, where each training video captures an associated fluid filling process. Each training video may include multiple training images (e.g., frame images) each labeled with one of multiple classifications, where one of the classifications indicates a drip in the training image. The training process may train the machine learning model using the training images from training videos and the labels associated with each training image. The trained machine learning model may include trained weights, for example, trained weights of a neural network model. Examples of a neural network model may include a convolutional neural network (CNN) or any variations thereof. The training process may use any training algorithms, such as, for example, gradient descent or any other suitable algorithms.

In some examples, the training process may provide a portion of each of the training images, instead of the whole images, to train the machine learning model. Similarly, a portion of an image may be provided to the trained machine learning model to detect an anomaly. As such, images with reduced size are provided to the machine learning model, resulting in fewer computations and less processing time for detecting the anomalies. In some embodiments, the portion of an image for providing to the machine learning model may be determined by reducing the field of view of the image. In some examples, the portion of the image to be provided to the machine learning model may be determined based on the intensities of the images. In various embodiments, determining the portion of an image may be performed onto an image in a video of a filling process. In other embodiments, the portion of the image for the machine learning model may be determined by the image capturing sensor, which is configured to determine an appropriate field of view and generate the portion of the image based on the determined field of view. For example, based on the intensities of the image, the image sensor may determine a central view of the image, and generate an image including the central view.

In various embodiments described herein, the system may process an image to identify the filling component and/or fluid, where the identified filling component and/or fluid will be used by other processes to detect the anomalies in the filling process. In identifying the filling component and/or fluid in an image, the system may identify edge pixels in the image and determine one or more bounded areas based on the edge pixels. In some examples, the value of pixels for a filling component and for fluid in an image may be different. For example, the fluid may be shown in bright color, and the filling component may be shown in dark color. Thus, in identifying the filling component and/or fluid, the system may perform different operations to identify edge pixels in the image. For example, in identifying the filling component, the system may subtract the image from a reference image in the video of the filling process. In a non-limiting example, the reference image in the video may be the first image in the filling process. In identifying the fluid, the system may subtract the reference image in the video from the current image. Optionally, the system may apply a filter to remove noise from the subtracted image while preserving the edge pixels. Optionally, the system may binarize the subtracted image or the filtered subtracted image before identifying the edge pixels.

In some embodiments, the system may further process the edge pixels to generate one or more bounded areas, where each of the bounded areas includes connected edge pixels, such as, for example, 4-connected or 8-connected edge pixels. Various tracing algorithm may be used to find connected edge pixels. For each of the bounded areas, the system may determine whether the size of the bounded area exceeds a respective threshold for the filling component or fluid. If the size of the bounded area exceeds the respective threshold, the system may select the bounded area as the filling component or the fluid. In some embodiments, for the selected bounded area, the system may determine a bounding box that is a minimum rectangular box encompassing the selected bounded area. In some examples, the thresholds for selecting the filling component and selecting the fluid may be different.

In some embodiments, variations of identifying the filling component and/or fluid may be possible. For example, in subtracting the images previously described, the system may binarize the images before generating the subtracted image. In other variations, the system may identify the filling component or fluid by selecting the bounded area that has the largest area among the multiple bounded areas, rather than selecting the bounded area that has an area above a threshold area.

The techniques described herein may provide advantages over conventional filling systems in improving the performance of filling a container, e.g., a glass vial, by detecting anomalies in real-time while the container is being filled with liquid. For example, by using machine vision and/or machine learning techniques disclosed in the present disclosure, the system may detect various types of anomalies in high-speed video. These anomalies may include splash within container, drip within container, filling component submersion, or unsafe filling component-liquid distance. Detecting these anomalies may trigger the system to generate an alert to the user (e.g., an operator), so that the operator may take corrective measures timely. For example, the operator may adjust the flow of the fluid from the filling component to reduce splash and/or drip. The operator may also adjust the height of the filling component or the timing of inserting/retracting the filling component to avoid unsafe filling component-liquid distance.

Alternatively, and/or additionally, the system may automatically alter one or more parameters of the filling process based on the detected anomalies. For example, in response to detecting a splash in the filling process, the system may change one or more parameters of the filling process to cause the filling station to adjust the flow of the liquid from the filling component, the height of the filling component, or the timing of inserting/retracting the filling component, or a combination thereof. Similarly, in response to detecting a drip, a filling component submersion, and/or unsafe filling component-fluid distance in the filling process, the system may change one or more parameters of the filling process to cause the filling station to adjust the flow of the liquid from the filling component, the height of the filling component, or the timing of inserting/retracting the filling component, or a combination thereof. Thus, the various embodiments described herein may allow the filling system to timely detect and correct errors in the filling process, before a container may be discarded as in conventional systems at a later stage during inspection.

Whereas various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

FIG. 1 is a diagram of a system for detecting anomalies while filling a container with liquid, according to some embodiments. In some embodiments, a system 100 may include a filling machine 102 configured to perform a filling process in which a container 104 is filled with fluid using a filling component 108. A container may be any holder that can hold therein fluid or any matter in liquid state. The container may be transparent. Examples of a container may include a transparent drug product container, a glass vial, a bottle, a jar, and/or any suitable holder. A filling component may be any component that can fill the container with liquid. For example, a filling component may be a filling tube, a needle, a pipe, a nozzle, a funnel or any other component that may be used guide fluid into the container. Fluid may be a fluid drug product, for example, a pharmaceutical fluid. Other examples of fluid may include water, beverage, oil, food, chemicals, solutions, compounds, and/or any matter in liquid state. In an example, the container 104 may be a glass vial for holding fluid drug product. The filling component 108 may be a needle. For example, in the filling process, fluid may be injected into the container 104 via a needle 108 and a filling pump 106 that pumps fluid from a tank (not shown) through the filling component 108 to the container 104. As shown in FIG. 1, the needle may be inserted into the container 104 while the filling process is being performed. Once the filling process is completed, the needle may be retracted from the container 104.

System 100 may also include an image capturing device 112, such as a camera, which is configured to capture a video of the filling process. Thus, the video may include a sequence of images, and each image may contain the filling component and the container being filled with fluid. The system may further include a server 110 having at least a processor, a memory, a storage medium, and/or other components. The at least one processor may be configured to execute programming instructions stored in the memory to process the captured video by analyzing one or more images of the video, and to detect one or more anomalies in the filling process. In some examples, the filling process from start to finish can be completed in a short period of time, such as a few seconds. In some examples, the image capturing device 112 may therefore be a high speed camera that can capture the video of the filling process.

The server 110 may be configured to process the captured video in real-time during the filling process. In a non-limiting configuration, the container 104 may be placed on a filling platform 103. For example, the filling platform 103 may be a conveyor on an assembly line, nest and tub, or a turntable on which multiple containers to be filled are placed, where the filling platform may be controlled to move the containers. Each time the filling platform moves a container into a location for filling, the container on the filling platform 103 is engaged with the filling component 108 such that the filling component 108 is inserted into the container to fill the fluid. When the filling process is completed, the filling component is retracted from the container, and the filling platform moves so that the next container is moved into position, and the filling process for the next container begins, and so on. The server 110 can be configured to process the captured video during such a filling process. While the example in FIG. 1 only shows one filling component 108, it should be appreciated that multiple filling components can be configured to fill multiple containers, as desired.

The server 110 can be configured to process the captured video to monitor for potential anomalies that may occur during the filling process. An example of an anomaly may include filling component submersion, which can occur when the filling component is submerged into the liquid during a filling. An anomaly may also include a splash within the container, a drip within the container, or an unsafe filling component-fluid distance in the container (e.g., when the filling process is near completion). A splash anomaly may include a splash of fluid within the container, for example, on the neck of the container between the stopper/plunger and the glass. The splash anomaly may lead to foaming, or drying on needle tip. A drip anomaly may include a drip of fluid within the container, for example, a drip adheres to a filling component. An unsafe filling component-fluid distance anomaly may include a scenario in which the filling component comes within an unsafe distance of a surface of the fluid in the container. The unsafe distance may be outside a safe distance range, for example, the safe distance range may be between a low threshold distance and a high threshold distance. Other anomalies may include high velocity fluid splashing out of vial, drip adhering to the filling component and dropping in the next vial, causing an underdose/overdose scenario.

Figure 2B:
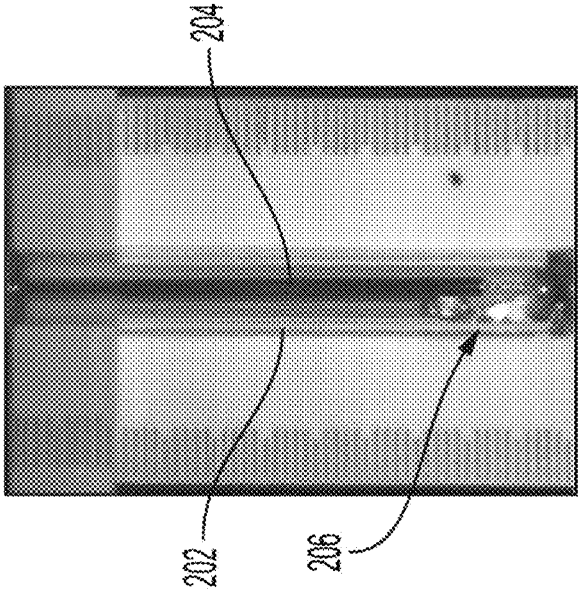
FIGS. 2A and 2B show examples of splash that may occur in a filling process, according to some embodiments.
Figure 2A:
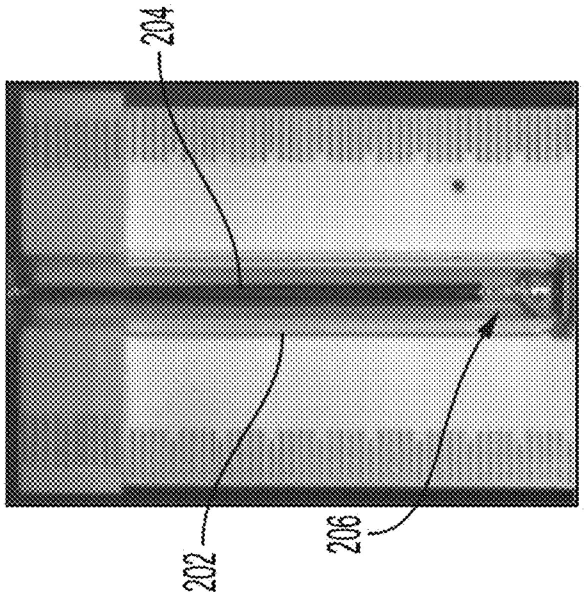
Figure 3B:
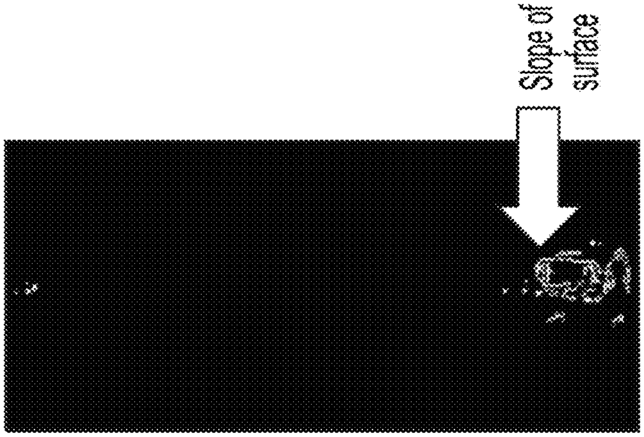
FIG. 3B shows an example of a slope of surface in detecting the splash in FIG. 3A, according to some embodiments.
Figure 3A:
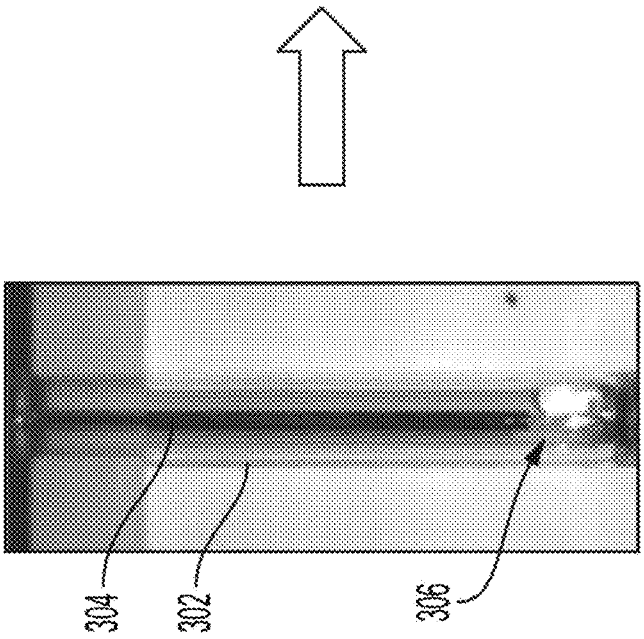
FIG. 3A shows an example of a splash that may occur during a filling process.
Figure 5B:
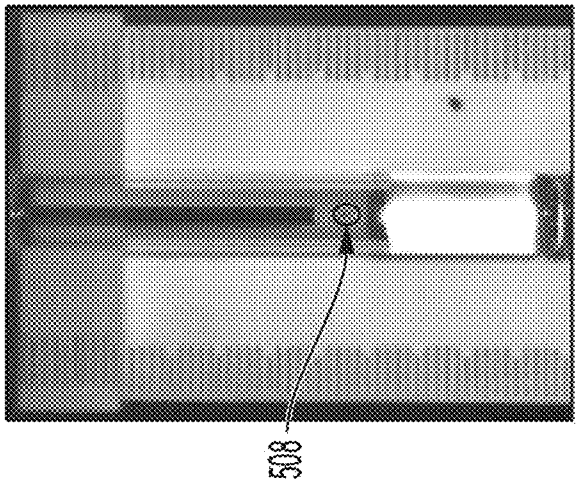
FIGS. 5B and 5C show examples of images of a filling process that show drips within the container, according to some embodiments.
Figure 5A:
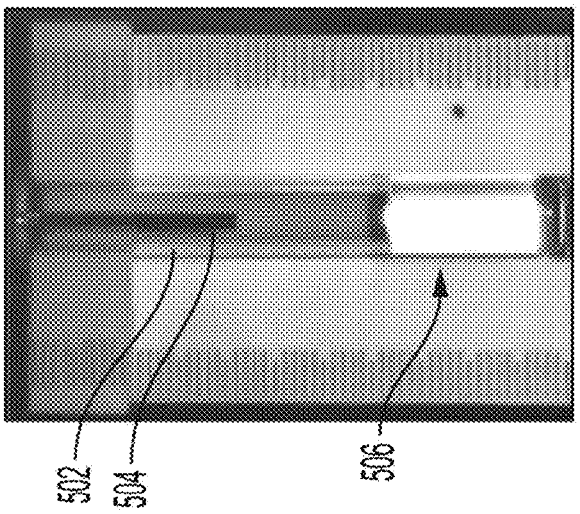
FIG. 5A shows an example image of a filling process that shows no drip of liquid, according to some embodiments.
Figure 7A:
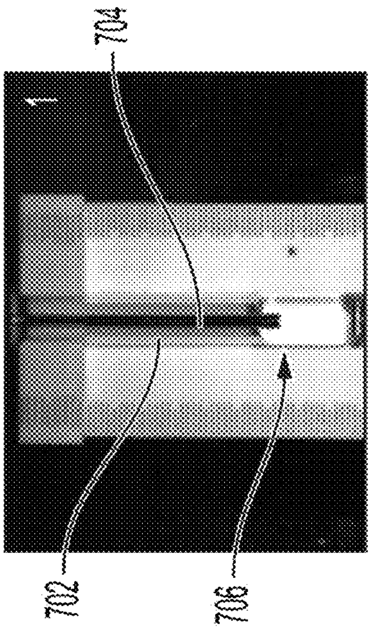
FIG. 7A shows an example image of a filling process that shows filling component submersion, and FIGS. 7B and 7C respectively show detected filling component and fluid from the image in FIG. 7A, according to some embodiments.
Figure 8B:
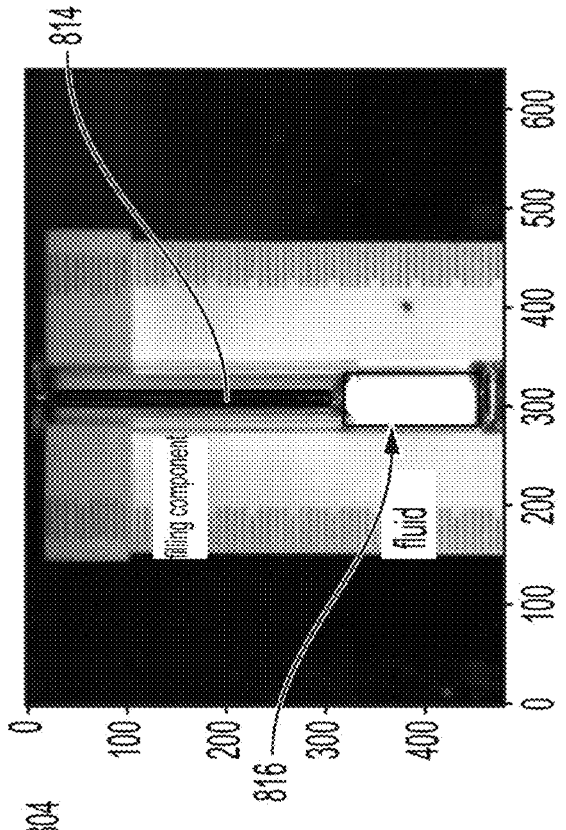
FIGS. 8A and 8B show example images of a filling process that have various unsafe filling component-fluid distances, according to some embodiments.
Figure 8A:
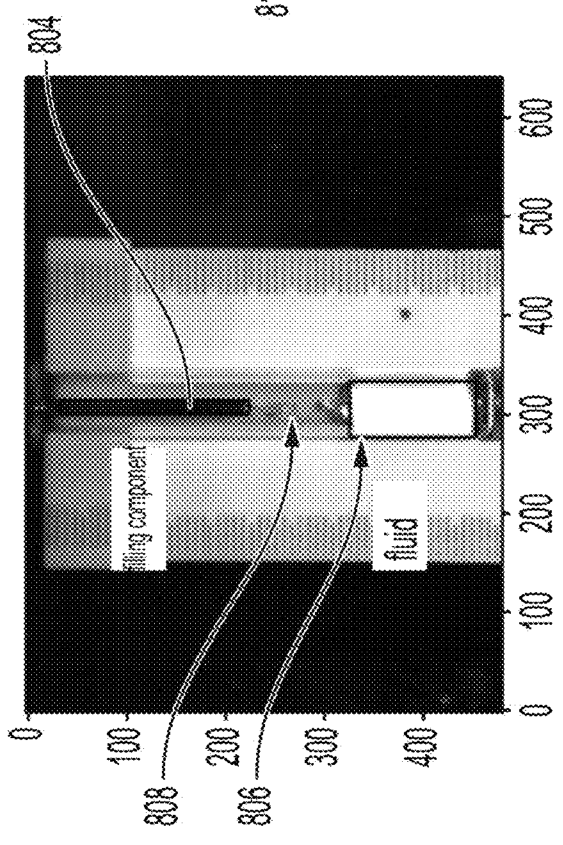

In some non-limiting examples, various types of anomalies are shown. For example, FIG. 2A shows a glass vial 202 and a filling component 204 (e.g., a needle), and an example of minimal splash of the fluid 206 that may occur in a filling process; FIG. 2B shows an example of a more severe splash of the fluid 206 compared to that shown in FIG. 2A, where the fluid 206 splashes above the filling component 204; and FIG. 3A shows an example of a moderate splash of the fluid 306 onto the side of the vial 302 when the fluid is being filled by a filling component 304 (e.g., a needle). FIG. 5A shows an example image of a filling process for a glass vial 502 and a filling component 504 (e.g., a needle) that shows no drip of the fluid 506. In comparison, FIGS. 5B and 5C both show a drip of the fluid 508 and 510, respectively. FIG. 7A shows an example of filling component submersion when the filling component 704 (e.g., a needle) is submerged into the fluid 706 in the glass vial 702. FIGS. 8A and 8B show example images of a filling process that have various unsafe filling component-fluid distances. For example, the distance between filling component 804 (e.g., a needle) and fluid 806 shown in FIG. 8A is too high, which causes a drip and/or splash 808, whereas the distance between filling component 814 (e.g., a needle) and fluid 816 shown in FIG. 8B is too small in that the filling component is touching or is about to touch the fluid, which may be caused by one or more parameters in the filling profile.

Returning to FIG. 1, once the potential occurrence of an anomaly is detected, the system may generate an alert indicative of the detected anomaly. The alert may include any suitable form and may be communicated to a user device in any suitable communication protocols to indicate to the user that an anomaly is detected. For example, server 110 may send a notification, a warning, or a report to a user device 114, via a communication link. The notification or the report may include information about the anomaly, and/or the type of anomaly. In some examples, the system may also tune the filling machine by altering, based on the detected anomaly, one or more tuning parameters of the filling process that the filling machine is configured to perform to reach an optimal filling profile. For example, server 110 may predict optimal machine parameters based on the detected anomalies and automatically transmit the predicted machine parameters to the filling machine 102.

In some embodiments, the system 100 may be configured so that the detection and/or reporting of anomalies may be performed in real-time. For example, while a container is being filled with fluid, in response detecting an anomaly, the system may generate an alert to the user (e.g., an operator) by sending the alert to the user device 114, so that the operator may timely take corrective measures. For example, the operator may adjust the flow of the fluid from the filling component to reduce splash and/or drip. The operator may also adjust the height of the filling component or the timing of inserting/retracting the filling component to avoid unsafe filling component-liquid distance.

In another example, server 110 can be configured to adjust one or more parameters of the filling station 102 during the filling process in order to achieve an optimal set of machine parameters that mitigate the possible occurrence of anomalies (e.g., such that while an anomaly may occur while filling one container, by adjusting parameter(s) in real-time during the filling process, that anomaly may be mitigated during the filling process of the next and/or subsequent containers). For example, in response to detecting a splash in the filling process, the server may change one or more parameters of the filling process to cause the filling station to adjust the flow of the liquid from the filling component, the height of the filling component, or the timing of inserting/retracting the filling component, or a combination thereof. Similarly, in response to detecting a drip, a filling component submersion, and/or unsafe filling component-fluid distance in the filling process, the system may change one or more parameters of the filling process to cause the filling station to adjust the flow of the liquid from the filling component, the height of the filling component, or the timing of inserting/retracting the filling component, or a combination thereof. Thus, the various embodiments described herein may allow the filling system to timely detect and correct errors in the filling process, before a container may be discarded as in conventional systems at a later stage during inspection. Details of methods that may be implemented in system 100 for detecting anomalies during the filling process are further described with reference to FIGS. 10-15.

Figure 10:
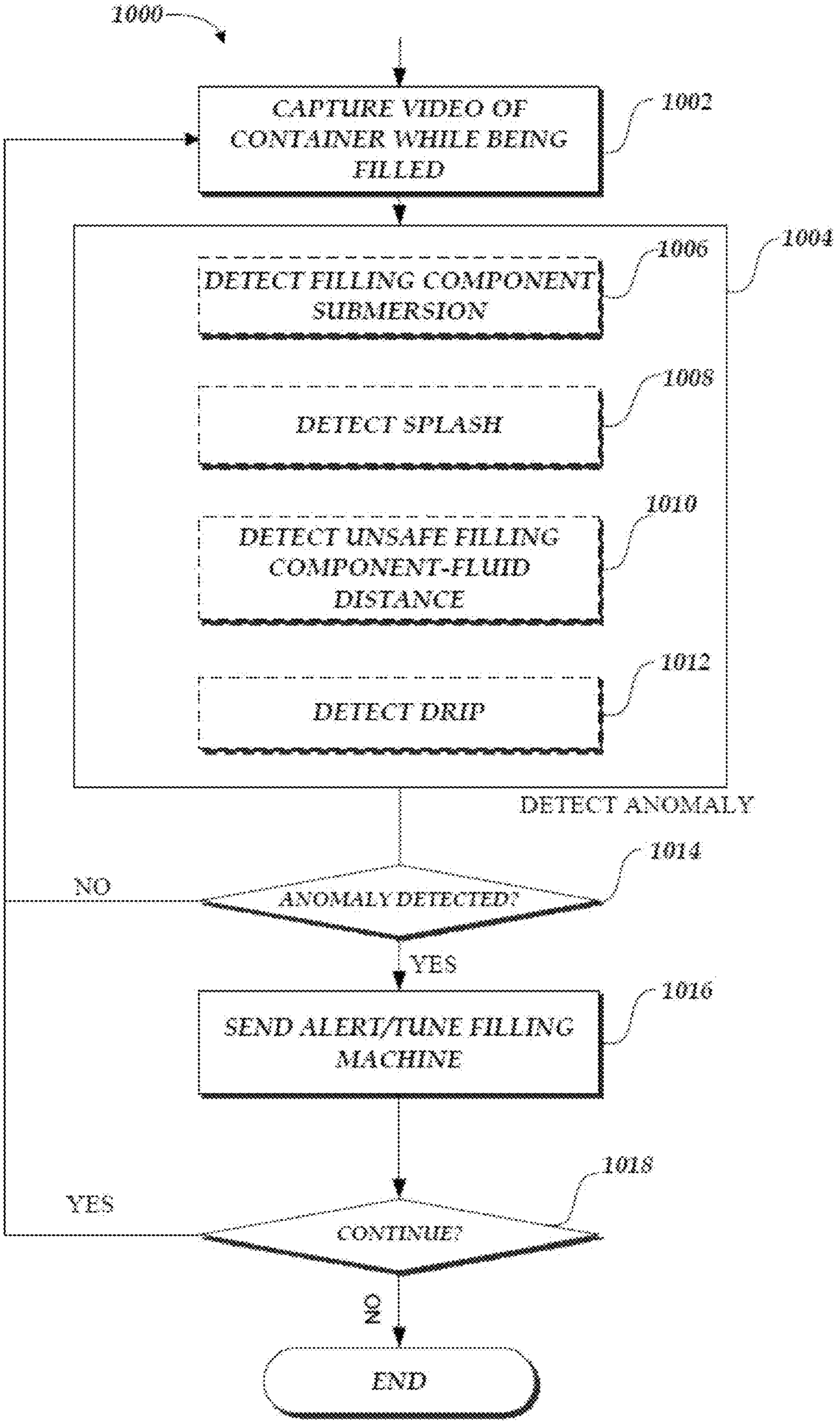
FIG. 10 is a flow chart showing an exemplary computerized method for detecting anomalies using a video of a filling process and tuning a filling machine based on the detected anomalies, according to some embodiments.

FIG. 10 is a flow chart showing an exemplary computerized method 1000 for detecting one or more anomalies using a video of a filling process and tuning a filling machine based on the detected anomalies, according to some embodiments. In some embodiments, method 1000 may be implemented in system 100, for example, or may be performed by server 110. In some examples used to describe the techniques herein, method 1000 begins at act 1002, where the video of a container is captured while the container is being filled. The video may include a plurality of frame images that are captured over time. Method 1000 may further analyze these images and detect the possible occurrence of various anomalies at act 1004. For example, act 1004 may include act 1006 of detecting a filling component submersion, act 1008 of detecting a splash, act 1010 of detecting an unsafe filling component-fluid distance, and/or act 1012 of detecting a drip. Exemplary techniques that can be used to detect the anomalies are further described in FIGS. 11-15.

With further reference to FIG. 10, at act 1014, method 1000 may determine whether any anomaly is detected from act 1004. In response to determining one or more anomalies, method 1000 may proceed to act 1016 of tuning the filling machine based on the detected one or more anomalies. Additionally, and/or alternatively, act 1016 may include sending an alert, e.g., a notification, a warning, and/or a report to a user device, via a communication link. The alert may include information about the anomaly (e.g., a time of the anomaly, a vial or container associated with the anomaly, and/or the type of anomaly). Exemplary details of act 1016 are described previously in embodiments of FIG. 1. Once act 1016 is completed, method 1000 may proceed to act 1018. Method 1000 may end the process (e.g., at the conclusion of a set of fillings) or to continue the process by returning to act 1002. Similarly, at act 1014, in response to determining that no anomalies are detected, method 1000 may also return to act 1002 to continue capturing additional videos of the filling process and monitoring for anomalies in the videos at act 1004.

Figure 11:
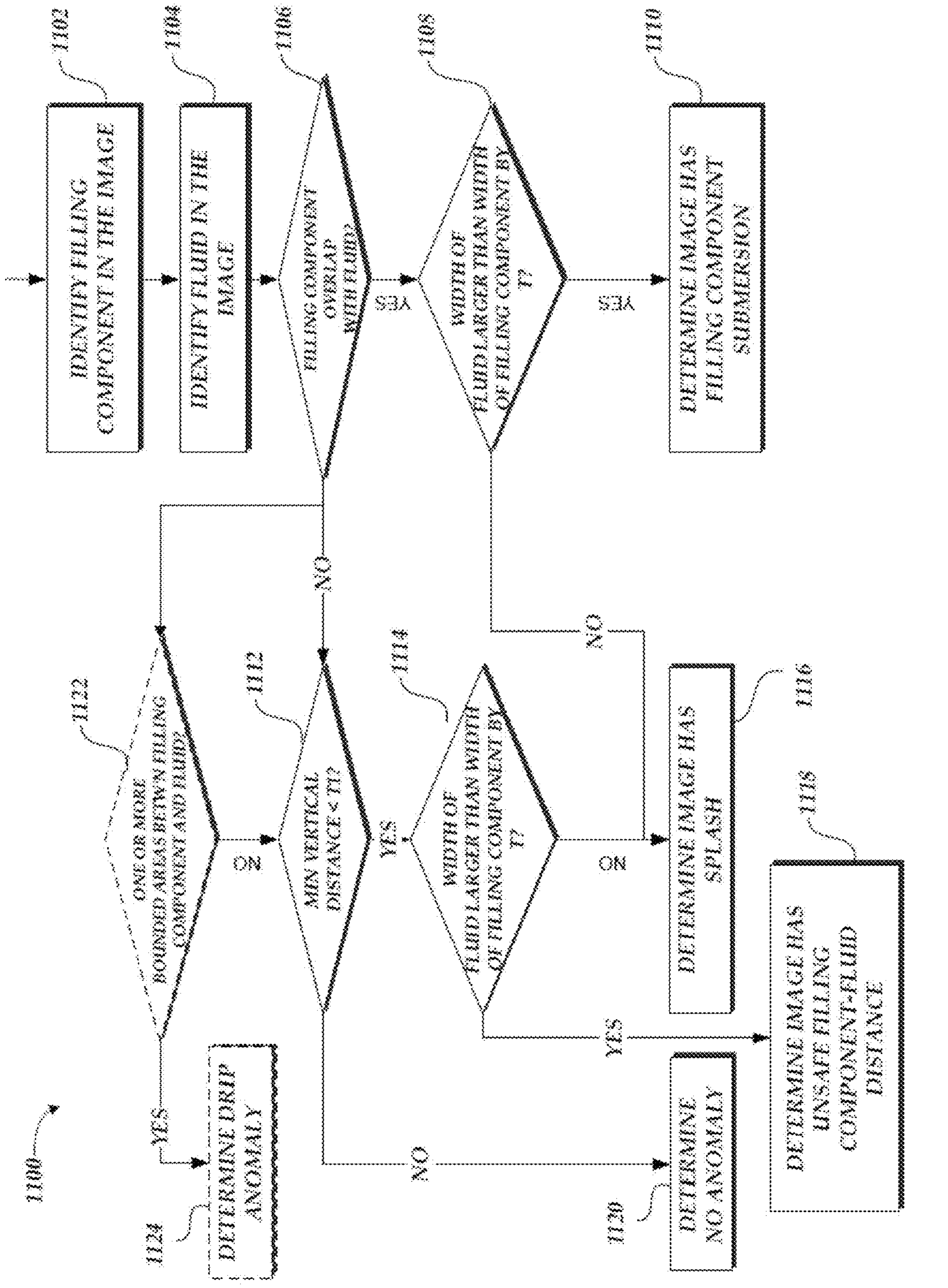
FIG. 11 is a flow chart showing an exemplary computerized method for detecting various types of anomalies using an image of a filling process, according to some embodiments.

FIG. 11 is a flow chart showing an exemplary computerized method 1100 for detecting various types of anomalies using an image of a filling process, according to some embodiments. In some embodiments, method 1100 may be implemented in act 1004 of FIG. 10 and/or may be performed in system 100 of FIG. 1, such as, for example, by server 110. In some examples used to describe the techniques herein, method 1100 begins at act 1102, 1104 to identify the filling component and fluid in the image, respectively. The image may be one or more frame images in a video, such as a video of a filling process captured in act 1002 of FIG. 10 as described herein. Thus, each image of the filling process may contain a container, a filling component inserted in the container, and fluid in the container, where the fluid is being filled by the filling component in the filling process. Exemplary techniques that can be used to identify the filling component and the fluid will be further described with respect to FIGS. 15A and 15B.

With further reference to FIG. 11, method 1100 may proceed to detect an anomaly based on a relative position between the filling component and the fluid. For example, at act 1106, method 1100 may determine whether the filling component overlaps with the fluid. In some embodiments, the identified filling component and the fluid may each be represented by a respective bounding box. In the examples in FIGS. 4A and 4B, the bounding box of the filling component 420 and the bounding box of the fluid 422 are identified from the image shown in FIG. 4B. In determining whether the filling component overlaps with the fluid, act 1106 may determine whether the bounding box of the filling component overlaps with the bounding box of the fluid. In response to determining that the filling component overlaps with the fluid, method 1100 may proceed to act 1108 of determining whether the width of the fluid is greater than the width of the filling component by a threshold width. For example, act 1108 may compare the width of the bounding box of the filling component with the width of the bounding box of the fluid. In response to determining that the width of the bounding box of the fluid is larger than the width of the bounding box of the filling component by a threshold width T, method 1100 may proceed to act 1110 of determining that the image has a filling component submersion anomaly. The threshold width T may be expressed as a number of pixels or a number of distance units (e.g., millimetres, inches and the like). For example, in some embodiments, the width of the fluid bounding box may be approximately 55-59 pixels, the width of the filling component bounding box may be approximately 12-14 pixels, and the threshold width T may be set at 8 pixels.

In some embodiments, a threshold width ratio specifying a minimum required ratio of the width of the fluid bounding box relative to the width of the filling component bounding box may be used in place of a threshold width T. For example, once the width of the bounding box of the filling component is determined, act 1108 may determine whether the width of the bounding box of the fluid is at least 2.5 times larger than the width of the filling component bounding box. That is, the required ratio between the width of the fluid bounding box and the width of the filling component bounding box may be at least 2.5 to 1. In other embodiments, other suitable ratios may also be used. By using a threshold width ratio, the determination in act 1108 may be made independent of camera resolution and camera distance from the filling component and fluid being imaged. Other methods of comparing the width of the bounding box of the fluid and the width of the bounding box of the filling component may also be used.

The inventors have recognized and appreciated that the filling component submersion may occur only after the filling process has started for some time. Thus, optionally, the system may detect the filling component submersion anomaly in response to determining additionally that the filling has started. For example, method 1100 may determine that the filling process has started if an elapsed time in the filling process is greater than a threshold filling time. The threshold filling time may vary, depending on the size of the container, the speed of the filling or other filling parameters. For example, the faster the speed of the filling is, the shorter the threshold filling time is. In other embodiments, method 1100 may determine that the filling process based on a signal from the system filling the container that it has started the filling process.

Figure 4B:
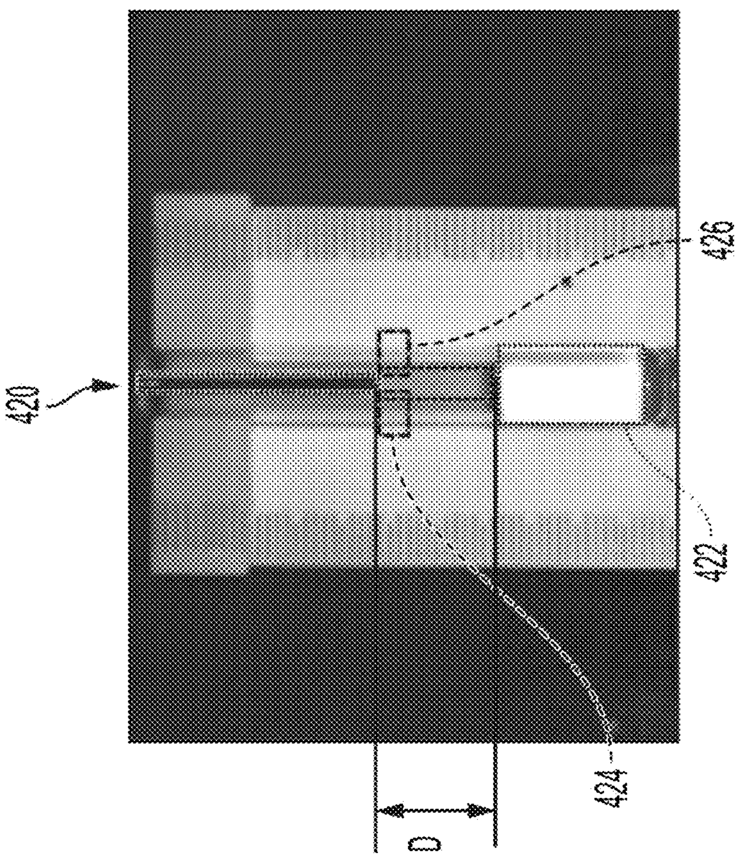
FIG. 4B shows the example bounding boxes in FIG. 4A overlaid onto an image of a filling process from which the bounding boxes in FIG. 4A are detected, according to some embodiments.

Returning to act 1108, if the width of the bounding box of the fluid is not larger than the width of the bounding box of the filling component by the threshold width T (or by the required threshold width ratio), the scenario may be that the fluid does not take up the entire container width like the bounding box 422 of FIG. 4B. Instead, what the system identified as the fluid or filling component may be a splash. Accordingly, method 1100 may detect a splash within the container at act 1116 in response to determining that the width of the bounding box of the fluid is not larger than the width of the bounding box of the filling component by the threshold width T.

Returning to act 1106, in response to determining that the bounding box of the filling component does not overlap with the bounding box of the fluid, method 1100 may proceed to act 1112 to further determine whether a vertical distance between the filling component and the fluid is less than a threshold distance T1. When the bounding box of the filling component does not overlap with the bounding box of the fluid, the vertical distance between the filling component and fluid may be measured as the distance between the bottom edge of the bounding box of the filling component and the top edge of the bounding box of the fluid. In the example above, where the width of the fluid may be 55-59 pixels, the filling component may be a needle, of which the width may be 12-14 pixels, the threshold distance T1 may be 8 pixels. As shown in FIG. 4B, this vertical distance is shown as distance D.

In response to determining that the vertical distance between the filling component and the fluid is less than a threshold distance T1, method 1100 may proceed to act 1114 to determine whether the width of the bounding box of the fluid is not larger than the width of the bounding box of the filling component by a threshold width T2. If the width of the bounding box of the fluid is not larger than the width of the bounding box of the filling component by the threshold width T2, the scenario may be that the fluid does not have a regular shape like the bounding box 422 of FIG. 4B. Instead, what the system identified as the fluid or filling component may otherwise be a splash. Accordingly, method 1100 may detect a splash within the container at act 1116 in response to determining that the width of the bounding box of the fluid is not larger than the width of the bounding box of the filling component by the threshold width T2. In some embodiments, the threshold distance T1 and the threshold width T2 may vary depending on the size of the container, the size of the filling component, and/or one or more parameters of the filling process. For example, similar to threshold width T1, a threshold width ratio of the width of the bounding box of the fluid over the width of the bounding box of the filling component may also be used in place of threshold width T2.

Additionally, and/or alternatively, act 1116 may detect the splash anomaly in response to determining that the filling has just started (e.g., since the splash may be more likely to happen at the beginning of the filling process compared to when the filling process has been performed for some time). In determining whether a filling has just started, method 1100 may determine an elapsed time since the start of the filling process and determine whether the elapsed time in the filling process is less than a threshold filling time. The threshold filling time may vary depending on the size of the container, the size of the filling component, and/or one or more parameters of the filling process, such as the speed of filling. For example, the faster the speed of filling is, the shorter the threshold filling time is.

Returning to act 1114, if the width of the bounding box of the fluid is larger than the width of the bounding box of the filling component by a threshold width T2, the scenario may be that the fluid has a regular shape like the bounding box 422 of FIG. 4B. Thus, act 1118 may determine the image has unsafe filling component-fluid distance in response to determining that the minimal vertical distance between the filling component and the fluid is less than threshold distance T1. An unsafe filling component-fluid distance that is too small may indicate that the liquid may touch or is about to touch the filling component. Returning to act 1112, in response to determining that the minimal vertical distance between the filling component and the fluid is not less than the threshold distance T1, method 1100 may determine there is no anomaly at act 1120.

The various acts shown in FIG. 11 may be performed on an image of a filling process. Additionally, these acts may be performed repeatedly over a plurality of images in a video of a filling process. Various acts in FIG. 11 may analyze additional images in the video of the filling process and the detection of anomalies may be performed at video level. For example, method 1100 may determine that the filling process has a filling component submersion anomaly if any of the images in the video is determined to have a filling component submersion anomaly. In other examples, method 1100 may determine the filling process has a splash anomaly if any of the images in the video is determined to show a splash anomaly, or if the number of images in the video that have a splash anomaly is greater than a threshold number. In other examples, method 1100 may determine that the filling process has an unsafe filling component-fluid distance if at least one of the images in the video is determined to show an unsafe filling component-fluid distance.

Figure 6A:
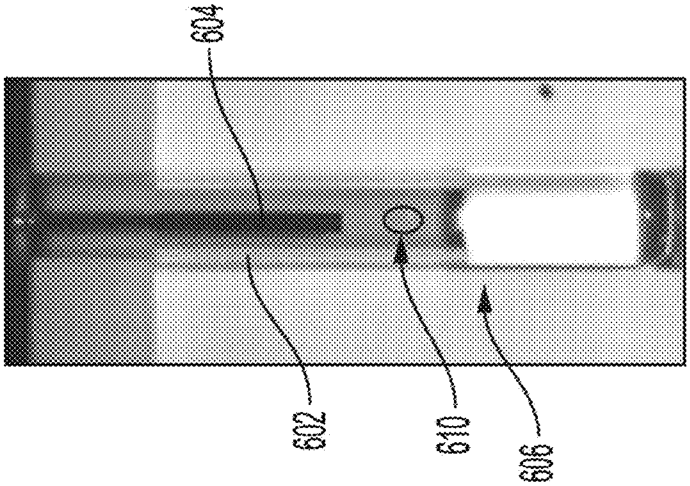
FIG. 6A shows an example image of a filling process that has a drip.
Figure 6B:
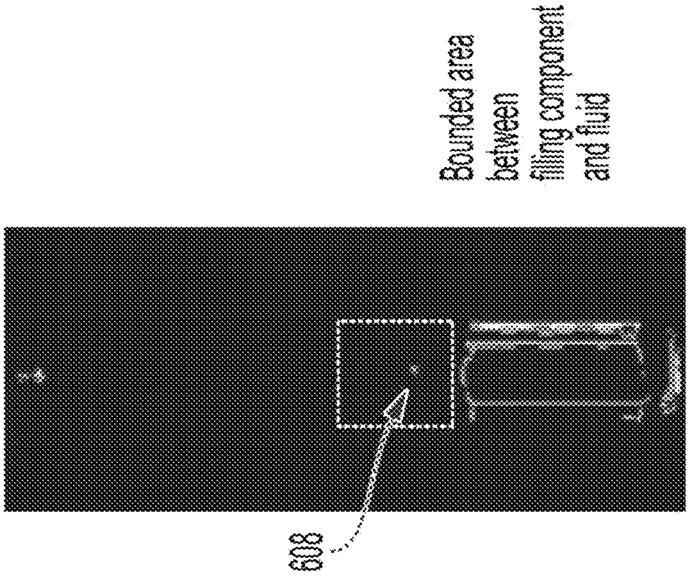
FIG. 6B shows a bounded area between the filling component and fluid in detecting the drip from the image in FIG. 6A, according to some embodiments.

In some embodiments, variations of method 1100 for detecting various types of anomalies may be possible. For example, in response to determining that the filling component does not overlap with fluid at act 1106, method 1100 may determine whether there is a drip between the filling component and the fluid. In an example, method 1100 may determine one or more bounded areas in the area between the filling component and the fluid. In some examples, when the image of the filling process is converted to a binary image, a drip in the image may include a plurality of high intensity pixels. Thus, method 1100 may determine one or more bounded areas based on the plurality of high intensity pixels. A bounded area may include connected pixels, such as, for example, 4-connected or 8-connected pixels. Method 1100 may use various tracing algorithms to find connected pixels. If one or more bounded areas between the filling component and the fluid are identified at act 1122, method 1100 may determine a drip anomaly between the filling component and the fluid at act 1124. As an example, FIG. 6A shows an example image of a filling process that has a drip 610 of the fluid 606 in a vial 602, and FIG. 6B shows a bounded area 608 between the filling component 604 (e.g., a needle) and the fluid 606, where the bounded area indicates a drip anomaly.

Figure 12:
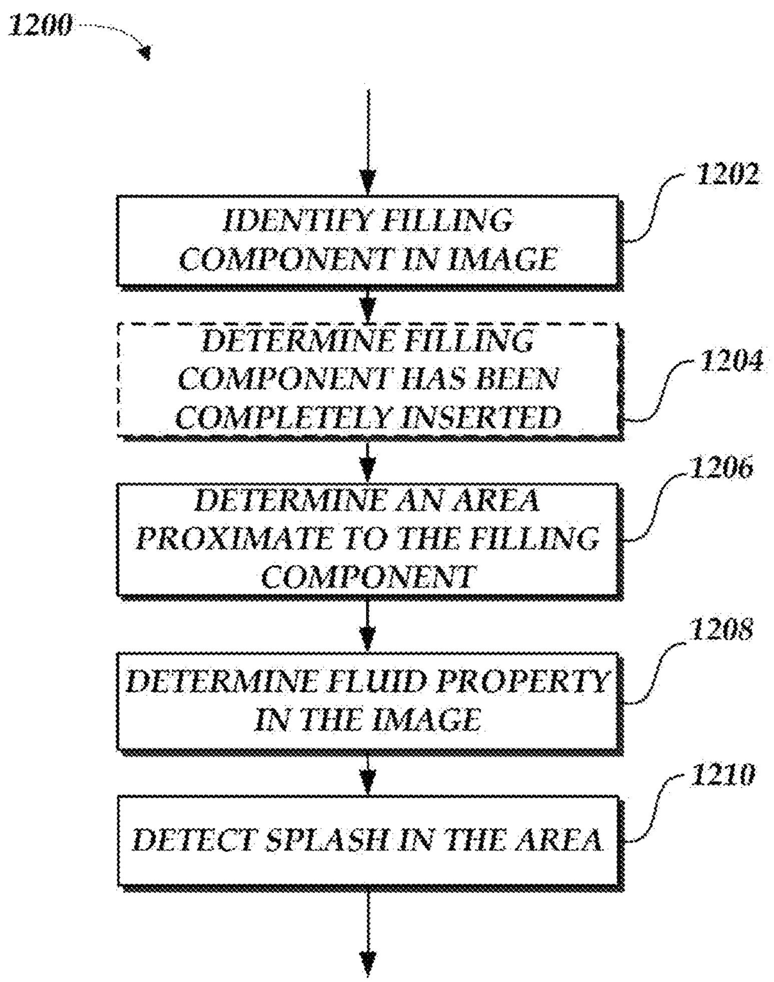
FIG. 12 is a flow chart showing an exemplary computerized method for detecting splash anomaly using an image of a filling process, according to some embodiments.

In another example, FIG. 12 is a flow chart showing an exemplary computerized method 1200 for detecting splash anomaly using an image of a filling process, according to some embodiments. In some embodiments, method 1200 may be implemented in act 1004 of FIG. 10 and/or may be performed in system 100 of FIG. 1, such as, for example, by server 110. In some examples used to describe the techniques herein, method 1200 begins at act 1202 of identifying the filling component in the image. Similar to process 1100, the image may be one or more frame images in a video, such as a video of a filling process captured in act 1002 of FIG. 10. Thus, each image of the filling process may contain a container, a filling component inserted in the container, and fluid in the container, where the fluid is being filled by the filling component in the filling process. Exemplary techniques that can be used to identify the filling component will be further described with respect to FIGS. 15A and 15B.

Figure 4A:
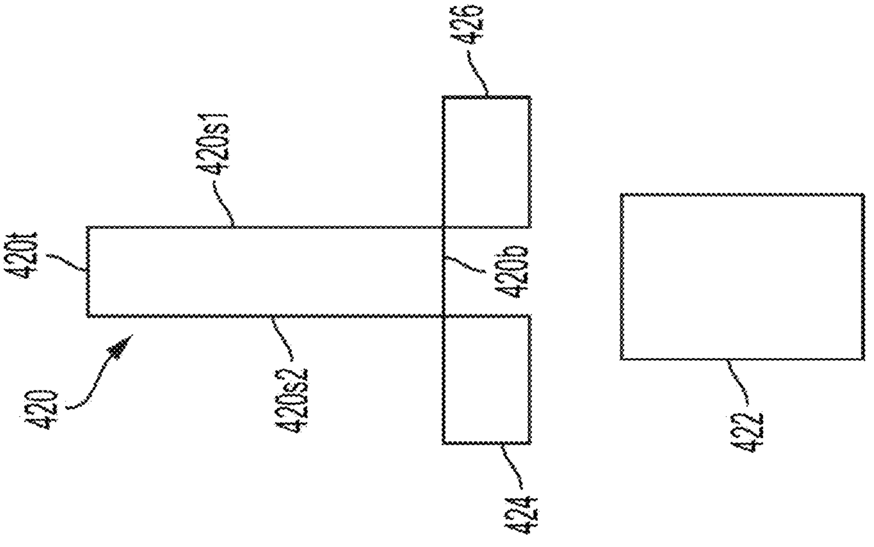
FIG. 4A shows examples of bounding boxes in detecting a splash, according to some embodiments.

Method 1200 may proceed to check a fluid property in an area around the filling component. For example, method 1200 may proceed to act 1206 of determining an area in the image proximate to the identified filling component. Detecting the area proximate to the filling component is further illustrated with reference to FIGS. 4A and 4B. FIG. 4A shows examples of bounding boxes that can be used to detect a splash. FIG. 4B shows the example bounding boxes in FIG. 4A overlaid onto an image of a filling process from which the bounding boxes in FIG. 4A are detected, according to some embodiments. A filling component in the image shown in FIG. 4B is identified and represented in a bounding box 420. As illustrated in FIG. 4A, the bounding box 420 may have a rectangular shape, having a top **420*t*, two sides 420*s*1 and 420*s*2, and a bottom 420*b*. In some embodiments, the area proximate to the filling component may include a first area 424 positioned on one side of the bounding box of the filling component 420 and a second area 426 on the opposite side of the bounding box of the filling component 420**.

As shown in FIG. 4A, a proximate side edge of the area 424 may be aligned with a side edge **420*s*1 of the bounding box 420 and a proximate side edge of the area 426 may be aligned with a side edge 420*s*2 of the bounding box 420. The top edge of the area 424 and the top edge of the area 426 may be aligned with the bottom edge 420*b* of the bounding box 420. In some examples, the width and the height of the areas 424, 426 may vary depending on the size of the container, the size of the filling component, and/or one or more parameters of the filling process. The width of the first or the second area may be a fixed width. Alternatively, the width of the first or the second area may be proportional to the width of the filling component. Similarly, the height of the first or second area may be a fixed height, or may be proportional to the vertical distance between the filling component and the fluid. Exemplary techniques that can be used to identify the filling component will be further described in detail in FIGS. 15A and 15**B.

Returning to FIG. 12, method 1200 may further include act 1208 of determining a fluid property in the image. In some examples, act 1208 may determine the fluid property in the area proximate to the filling component, such as the bounding boxes 424, 426 shown in FIG. 4A. A fluid property may include a slope (or rise) in a surface of the fluid. In some examples, act 1208 may determine the surface of the fluid in the area based on surface edge pixels in the area. The surface edge pixels may be determined by applying an edge detector, e.g., Canny operator or any other suitable edge detectors, to the image in which the filling component and the fluid are identified. Act 1208 may determine one or more fluid edges based on the fluid surface edge pixels. For example, each of the one or more fluid edges may be 4- or 8-connected edges from the surface edge pixels. In case of 4-connected edges, a pixel is to be connected to another pixel only if one lies on immediate top/bottom/left/right of the pixel. In case of 8-connected edges, any pixel which lies in either of the eight adjacent pixels (e.g., top, bottom, left, right, top/left, top/right, bottom/left, bottom/right) will be considered as a connected pixel. Act 1208 may determine a maximum vertical coordinate and a minimum vertical coordinate among the fluid surface edge pixels in the area near the filling component, and determine the slope in the surface of the fluid based on a difference between the maximum and minimum vertical coordinates. In some embodiments, the maximum vertical coordinate and the minimum vertical coordinate may be from any points among the fluid surface edge pixels. In other embodiments, the maximum and minimum vertical coordinates may be from a selected fluid surface edge.

Optionally, before determining the slope, act 1208 may remove all vertical edges from the one or more fluid edges. As such, the edge pixels belonging to those removed vertical edges will not be counted in determining the maximum and minimum vertical coordinates. Once the fluid property in the area is determined, method 1200 may proceed to act 1210 of determining whether the slope exceeds a threshold. In response to determining that the slope in a surface of the fluid in the area exceeds a threshold, act 1210 may detect a splash in the area. FIG. 3B shows an example of a slope of surface in detecting the splash in an image in FIG. 3A.

As described previously with reference to FIG. 4A, an area in the proximity of a filling component may include a first area and a second area (424, 426). In such case, detecting splash may be performed separately for each of the first and second areas. It is also appreciated that other variations may be possible. For example, the area near the filling component may be a single merged area combining the first and second areas, or another area proximate to the tip of the filling component. In such case, detecting splash may be performed for a single area. In some embodiments, detecting splash, as described in method 1200, may be performed for the first and the second areas in an image. In response to detecting a splash in at least one of the first and the second areas, method 1200 may determine that the image has a splash.

With further reference to FIG. 12, in some embodiments, method 1200 may optionally determine that the filling component has been completely inserted into the container (e.g., into the container a predetermined distance) at act 1204 before performing act 1206. Waiting for the filling component to be completely inserted in the container can, for example, ensure that the area around the filling component is accurately determined. In particular, the inventors have recognized and appreciated that the detected width of the filling component may vary as the filling component is inserted into the container. Accordingly, act 1204 may determine that the filling component has been completely inserted based on the variation of filling component width. In response to determining a variation of filling component width is below a threshold width, act 1204 may determine that the filling component has been completely inserted in the container.

In some examples used to describe the techniques herein, act 1204 may determine the variation of filling component width by analyzing a sequence of images in a video of the filling process. In some embodiments, the system determines the variation of filling component width based on a maximum width difference among the filling component widths in the multiple images in the video. In some embodiments, in determining whether the filling component has been completely inserted in the container in a given image, act 1204 may analyze multiple additional images preceding the given image in the video. Technologies as will be described with reference to FIGS. 15A and 15B may be used to identify a filling component for each of the multiple images in the video. As described previously, an identified filling component in an image may be represented by a bounding box. In such case, a filling component width in each image may be determined based on the width of the bounding box of the identified filling component.

Additionally, and/or alternatively, method 1200 may determine that the filling process has started before determining that the filling component has been fully inserted into the container at act 1204. This may further improve the accuracy of filling component detection/identification in an image. In some examples, method 1200 may determine that the filling process has started by determining whether fluid is detected in the image. If no fluid is detected, method 1200 may determine that the filling process has not started; otherwise, method 1200 may determine that the filling has started. Technologies as will be described with reference to FIGS. 15A and 15B may be used to detect/identify the fluid.

The various acts shown in FIG. 12 may be performed on an image of a filling process. Additionally, these acts may be performed repeatedly over a plurality of images in a video of a filling process. Various acts in FIG. 12 may analyze additional images in the video of the filling process such that the system can detect splash at the video level (e.g., using multiple frame images of the video, as opposed to using just one image). For example, method 1200 may determine that a splash occurred during a filling process if the system detects a splash in a number of images that exceeds a threshold number.

Figure 13:
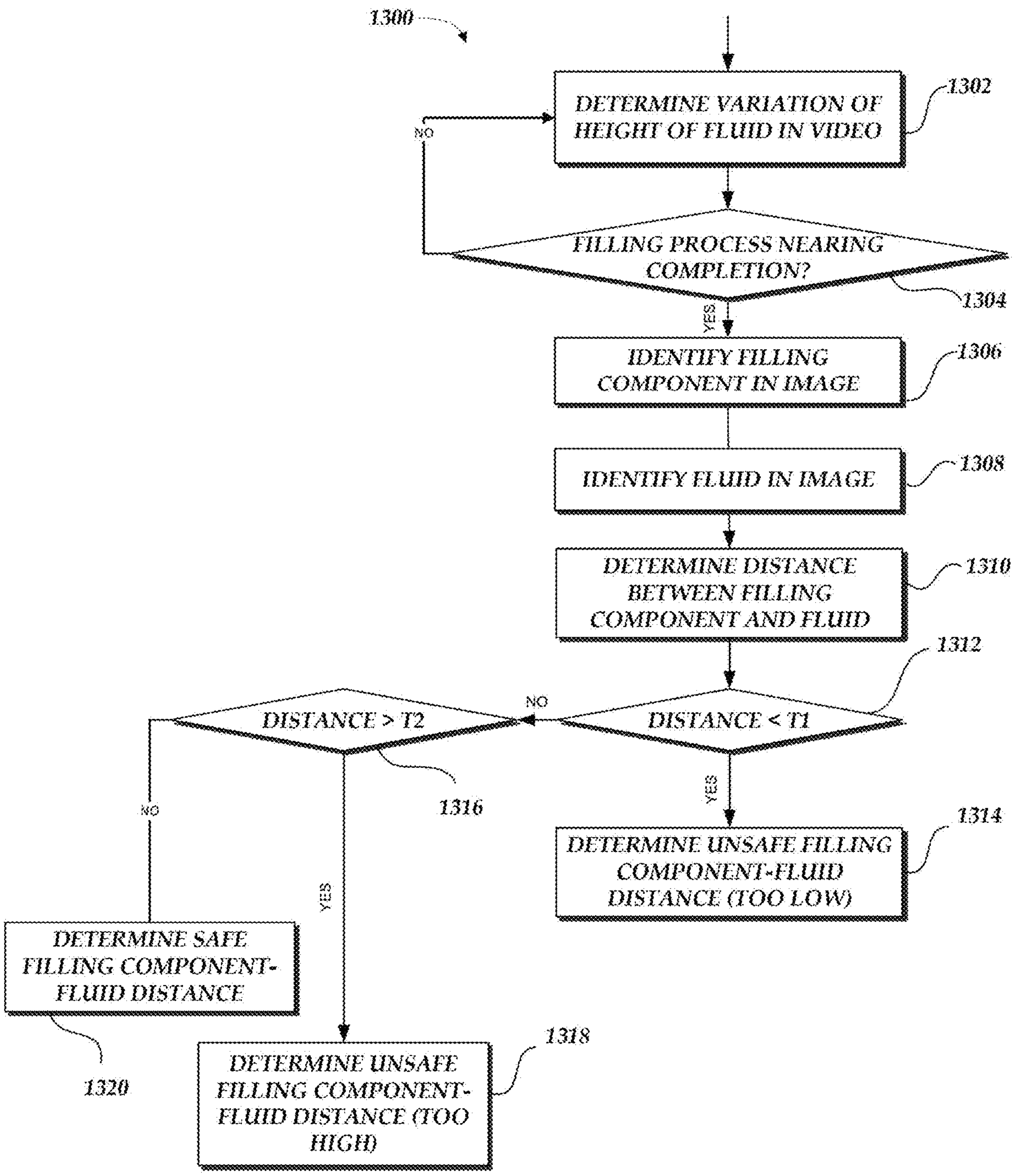
FIG. 13 is a flow chart showing an exemplary computerized method for detecting safe/unsafe filling component-fluid distance using a video of a filling process, according to some embodiments.

In another example, FIG. 13 is a flow chart showing an exemplary computerized method 1300 for detecting safe/unsafe filling component-fluid distance from a video of a filling process, according to some embodiments. In some examples used to describe the techniques herein, method 1300 begins at acts 1302, 1304 to determine whether the filling process is nearing completion. The filling process can be nearing completion when, for example, the valve controlling flow of the fluid closes and/or begins to close (e.g., and/or the filling component is about to retract), thereby cutting off the flow of liquid. At this point, the height of the fluid within the container should be stabilized and/or near-stabilized. Accordingly, method 1300 may check the height of fluid in the container to determine whether the filling process is nearing completion. For example, act 1302 may determine a variation of the height of the surface of the fluid in a number of consecutive images in the video. Exemplary technologies as will be described with reference to FIGS. 15A and 15B may be used to identify fluid for each of the multiple images in the video. As described previously, an identified fluid in an image may be represented by a bounding box. In such examples, the top edge of the bounding box of the identified fluid may indicate the height of the top surface of the fluid. Thus, act 1304 may compare the heights of the top surface of the fluid in the multiple images in the video by comparing the vertical coordinates (y-coordinate) of the top edge of the bounding boxes of fluid in these multiple images, and determine a variation of the vertical coordinates as the height variation. In response to determining that the height variation is below a threshold, act 1304 may determine that the filling process is nearing completion. Otherwise, act 1304 may proceed to analyzing additional images in a video at act 1302.

Once it is determined that the filling process is nearing completion, method 1300 may proceed to acts 1306, 1308 to identify the filling component and the fluid in the image respectively. As previously described with reference to FIGS. 4A and 4B, for example, the identified filling component and the fluid may each be represented by a respective bounding box. Once acts 1306 and 1308 are complete, method 1300 may proceed to act 1310 to determine the distance between the filling component and fluid. As previously described with reference to FIG. 4B, for example, a distance between the filling component and fluid may be determined as a vertical distance between the bounding box of the filling component and the bounding box of the fluid, such as distance D shown in FIG. 4B.

Returning to FIG. 13, method 1300 may proceed to determine whether the distance between the filling component and fluid is unsafe (e.g., too high, which may cause drip, or too low, which may cause submersion of the filling component). In some examples, two threshold distances may be provided, such as first and second threshold distances T1, T2, where T1<T2. At act 1312, the method may determine whether the distance between the filling component and the fluid is below the first threshold distance, such as T1. In response to determining that the distance is below the first threshold distance, method 1300 may detect an unsafe filling component-fluid distance anomaly at act 1314 by determining that the filling component-fluid distance is too low. Similarly, in response to determining that the distance is above the second threshold distance at act 1316, method 1300 may also detect an unsafe filling component-fluid distance anomaly at act 1318 by determining that the filling component-fluid distance is too high. If the distance between the filling component and the fluid is between T1 and T2, then method 1300 may determine a safe filling component-fluid distance at act 1320.

Figure 14:
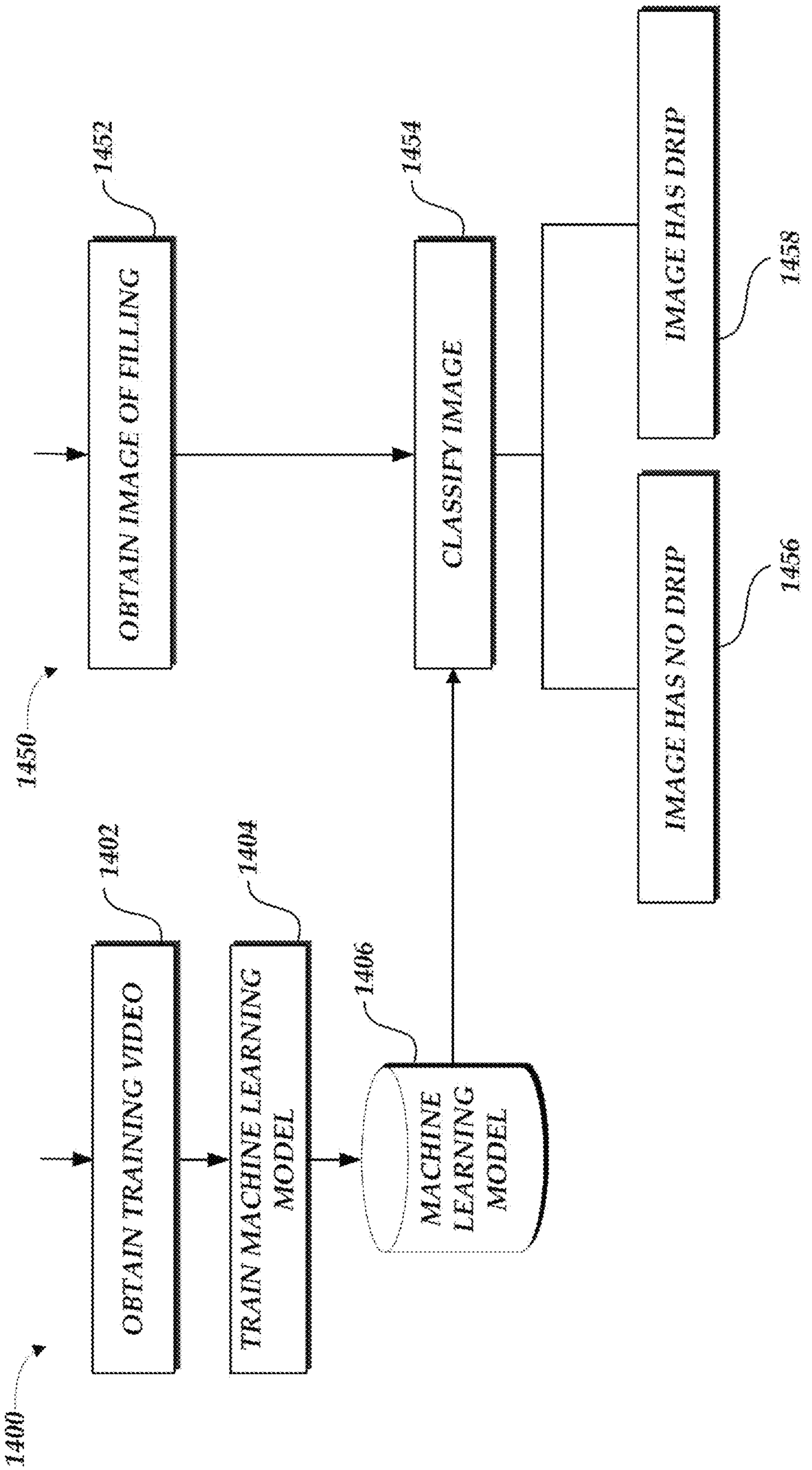
FIG. 14 is a flow chart showing an exemplary computerized method for detecting a drip using an image of a filling process, according to some embodiments.

In another example, FIG. 14 is a flow chart showing an exemplary computerized method for detecting a drip using an image of a filling process, according to some embodiments. In some embodiments, method 1450 may detect a drip using an image of a filling process using a machine learning model 1406. In some embodiments, the machine learning model 1406 may include a neural network model or any other suitable model or models, which will be further described herein (e.g., with reference to FIG. 9). Method 1400 may train the machine learning model 1406 using a plurality of training images. In some embodiments, methods 1400, 1450 may be implemented in act 1004 of FIG. 10 and/or may be performed in system 100 of FIG. 1, such as, for example, by server 110. In other embodiments, the machine learning model 1406 may be trained offline. For example, the machine learning model 1406 may be pre-trained by the same and/or different system (e.g., by a different system other than the system detecting the drip). As such, methods 1400 and 1450 may each be performed by one or more different computing devices.

In some examples used to describe the techniques herein, method 1400 begins by obtaining training video at act 1402 and training the machine learning model at act 1404 to generate the machine learning model 1406. In some embodiments, the training images may include a plurality of training images obtained from one or more training videos of filling processes. Each of the training images may include an image of a filling process when a container is being filled with fluid. For example, each training image may include a filling component and a container being filled with fluid through the filling component. In some examples used to describe the techniques herein, method 1450 begins at act 1452 of obtaining an image of a filling process. For example, the image may be a frame image of a video of the filling process. Similar to methods 1100, 1200, and 1300, the image may be one or more frame images in a video, such as a video of a filling process captured in act 1002 of FIG. 10. Act 1454 may use a trained machine learning model 1406 to classify the image into one of a plurality of classifications, where at least one of the plurality of classifications is indicative of a drip in the image. Based on the output of machine learning model, method 1400 may determine the image has no drip at act 1456 or the image has drip at act 1458.

In some examples, the machine learning model 1406 may include a neural network model that can be trained over a training data set in the training method 1400. In some embodiments, training method 1400 may obtain a plurality of training videos at act 1402, where each training video captures an associated fluid filling process. Each training video may include multiple training images (e.g., frame images) each labeled with one of multiple classifications, where one of the classifications indicates a drip in the training image. The trained machine learning model may include trained weights, for example, trained weights of a neural network model. Examples of a neural network model may include a convolutional neural network (CNN) or any variations thereof. The training method 1400 may use any training algorithm or algorithms, such as, for example, gradient descent and/or any other suitable algorithms.

Figure 5D:
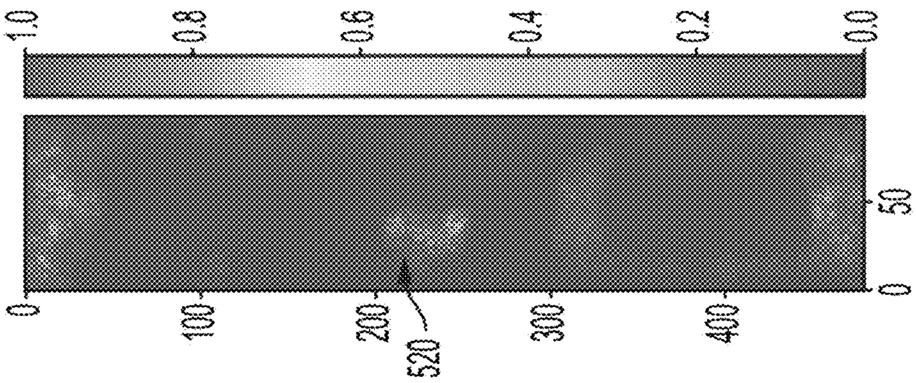
FIG. 5D shows an example salient map of an image of a filling process, where the samples in the salient map are shown in higher intensity around a drip, according to some embodiments.
Figure 5C:
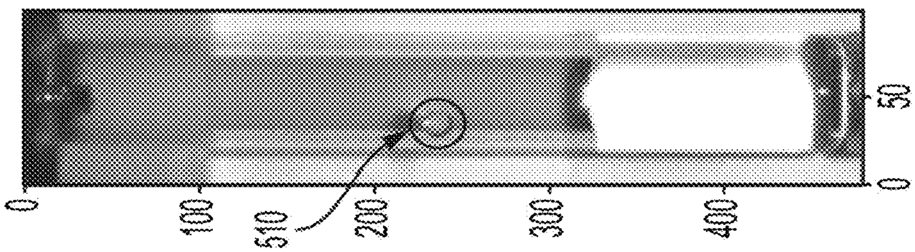
Figure 9:
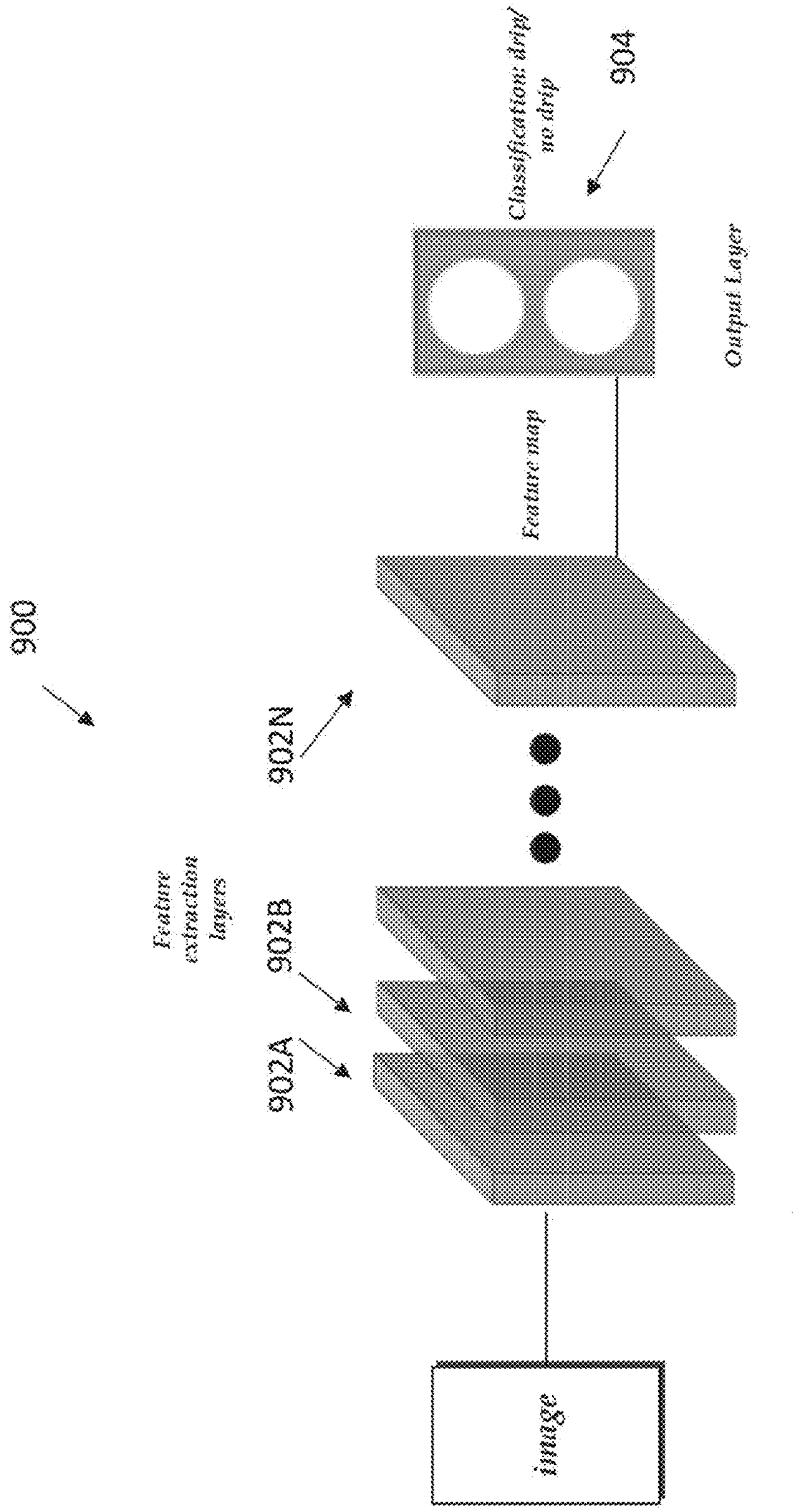
FIG. 9 is a diagram showing an exemplary convolutional neural network that may be implemented to detect a drip using an image of a filling process, according to some embodiments.

FIG. 9 is a diagram showing an exemplary convolutional neural network that may be implemented to detect a drip using an image of a filling process, according to some embodiments. For example, the convolutional neural network 900 may be implemented in the machine learning model 1406 of FIG. 14. As shown in FIG. 9, the neural network 900 may include a plurality of convolutional layers 902. The plurality of convolutional layers may be feature extraction layers configured to extract various features of an input image and generate a feature map. According to some embodiments, a feature map of a convolutional layer of a CNN or other neural network models can be used to compute the visual similarity between images having drips. For example, FIGS. 5A-5C show example images that show no drip or drips with various degrees. For example, FIG. 5A shows an example image of a filling process for a glass vial 502 and a filling component 504 (e.g., a needle) that shows no drip of the fluid 506. In comparison, FIGS. 5B and 5C both show a drip of the fluid 508 and 510, respectively. FIG. 5D shows an example salient map (feature map) of an image of a filling process, where the samples in the salient map are shown in higher intensity around a drip 520. In other words, a drip in an image of a filling process may be a visual feature which can be extracted by the convolutional layer(s) of the neural network model. Returning to FIG. 9, the neural network model 900 may include one or more output layers 904 configured to classify the output of the feature extraction layers into one of the classifications, of which one indicates a drip.

Returning to FIG. 14, in some examples, the training method 1400 may provide a portion of each of the training images, instead of the whole images, to train the machine learning model 1406, instead. Similarly, a portion of an image may be provided to the trained machine learning model 1406 to detect a drip anomaly in method 1450. As such, images with reduced size are provided to the machine learning model, resulting in fewer computations and less processing time for detecting the anomalies. In some embodiments, the portion of an image for providing to the machine learning model may be determined by reducing the field of view of the image. In some examples, the portion of the image to be provided to the machine learning model may be determined based on the intensities of the images. For example, the portion of the images to be provided to the machine learning model may be a central view of the images for which the left most and right most columns of the central view are determined based on the intensities of the images.

In a non-limiting example, for a given image, a sum of intensities for all pixels in each column is calculated. The sums of all of the columns are compared and a maximum sum of intensities is determined among all of the columns. In some embodiments, the columns in the image are analyzed in sequence from the first (or left-most) column in a left to right direction. For each column, the sum of intensities of all of the pixels for that column is compared with a threshold intensity. In some embodiments, the threshold intensity may be a fixed value. In other embodiments, the threshold intensity may be proportional to the maximum sum of intensities that is determined among all of the columns in the image. For example, the threshold intensity may be ⅓, ½, ¼ of the maximum sum of intensities. If the sum of intensities for a column is above the threshold intensity, that column in the image is determined to be the first column (or left-most column of the central view). Once the first column is determined, the remaining columns in the image are analyzed in sequence from the last (or right most) column in a right to left direction. For each column, the sum of intensities of all of the pixels for that column is compared with the threshold intensity. If the sum of intensities is above the threshold intensity, that column in the image is determined to be the second column (or right-most column of the central view). Subsequently, the central view of the image is formed based on the columns between the first and second columns in the image.

In various embodiments, the central view images may be generated in methods 1400, 1450. Alternatively, the central view images may be determined by the image capturing sensor (e.g., 112 of FIG. 1), which may be configured to determine an appropriate field of view and generate the portion of the image based on the determined field of view. For example, based on the intensities of the image or the motion in the image, the image sensor may determine the central view of the image, and generate an image including the central view for anomaly detection.

Various acts in method 1450 of FIG. 14 may analyze additional images in the video of the filling process and the detection of drip anomaly may be performed at the video level. For example, method 1450 may determine that the filling process has splash if any of the image or the additional images in the video is determined to show a drip anomaly.

Figure 15A:
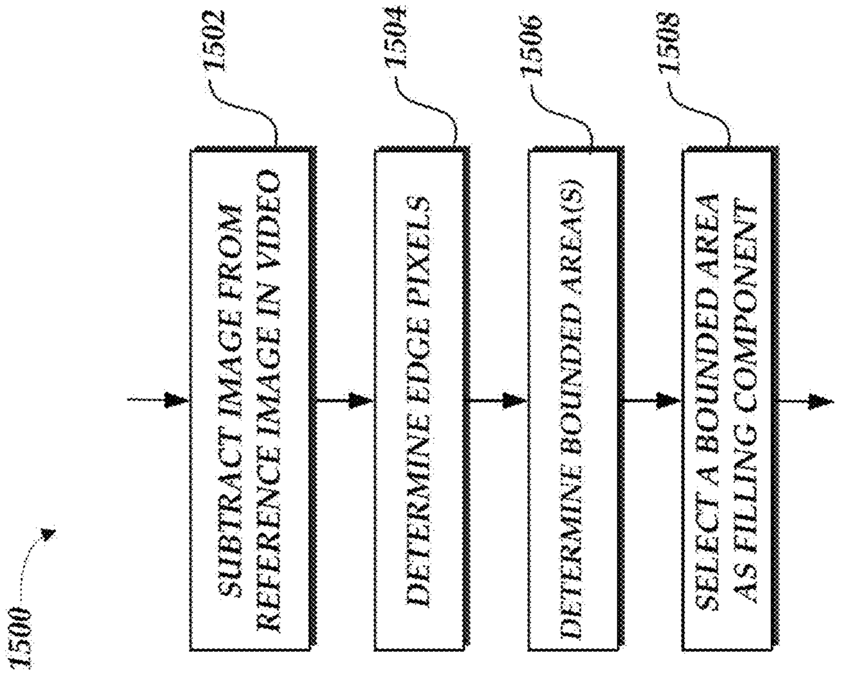
FIG. 15A is a flow chart showing an exemplary computerized method for detecting a filling component in an image of a filling process, according to some embodiments.
Figure 15B:
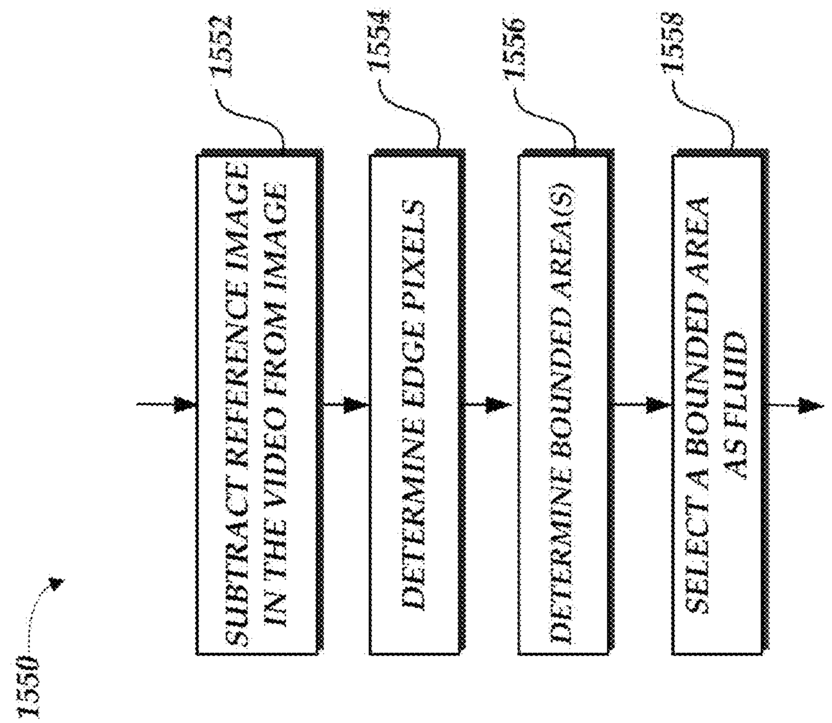
FIG. 15B is a flow chart showing an exemplary computerized method for detecting fluid in an image of a filling process, according to some embodiments.

In various embodiments described herein, the system may process an image to identify the filling component and/or fluid, where the identified filling component and/or fluid will be used by other processes to detect the anomalies in the filling process. FIG. 15A is a flow chart showing an exemplary computerized method for detecting a filling component in an image of a filling process, according to some embodiments. FIG. 15B is a flow chart showing an exemplary computerized method for detecting fluid in an image of a filling process, according to some embodiments. The methods in FIGS. 15A and 15B may be implemented in various acts, such as act 1004 of FIG. 10, acts 1102, 1104 of FIG. 11, act 1202 of FIG. 12, acts 1306, 1308 of FIG. 13, all of which may be implemented in system 100 of FIG. 1, such as by server 110.

In identifying the filling component and/or fluid in an image, the system may identify edge pixels in the image and determine one or more bounded areas based on the edge pixels. In some examples, the value of pixels for a filling component and for fluid in an image may be different. For example, the fluid may be shown in bright color with a higher intensity value, and the filling component may be shown in dark color with a lower intensity value. Thus, in identifying the filling component and/or fluid, the system may perform different operations to identify edge pixels in the image. In some examples used to describe the techniques herein, method 1500 may be provided to identify a filling component from an image in a video of a filling process. Method 1500 may begin at act 1502, where a different image between the image and a reference image in the video of a filling process may be generated. In a non-limiting example, act 1502 may subtract an image from a reference image preceding the image in the video of the filling process. The reference image in the video may be the first image in the filling process. In other examples, the reference image may the second, the third, or any image preceding the image in the video. The inventors have recognized and appreciated that during a filling process, the container may be positioned on the filling platform (e.g., 103 of FIG. 1) without movement. Thus, in subtracting the image from the reference image, the pixels of the container (which do not move during the filling process) may be zeroed out, generating no signals. On the other hand, if the filling component is shown in dark color (e.g., low intensity), subtracting the image from the reference image will reveal high intensity pixels at where the filling component is located.

Figure 7B:
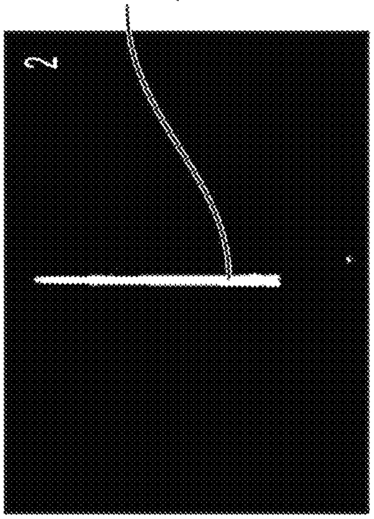

Method 1500 may proceed to act 1504 to determine edge pixels based on the subtracted image from act 1502. For example, act 1504 may binarize the subtracted image by a threshold. Optionally, before determining the edge pixels at act 1504, method 1500 may apply a filter, such as a bilateral filter to remove noise from the subtracted image while preserving the edge pixels. In some embodiments, these operations may also be performed in other orders. Method 1500 may continue to act 1506 to determine one or more bounded areas based on the edge pixels. In some embodiments, a bounded area may include connected edge pixels, such as, for example, 4-connected or 8-connected edge pixels. Various tracing algorithms may be used to find connected edge pixels. Once one or more bounded areas are determined, method 1500 may proceed to act 1508 of selecting a bounded area as the filling component. In some embodiment, act 1508 may determine, for each of the bounded areas, whether the size of the bounded area exceeds a respective threshold area for the filling component. If the size of the bounded area exceeds the threshold area for the filling component, the method may select the bounded area as the identified filling component. In some embodiments, for a selected bounded area, the method may determine a bounding box of the identified filling component by determining a bounding box that is a minimum rectangular box encompassing the selected bounded area. An example is shown in FIG. 7B, where the edge pixels at high intensity show the detected filling component from the original image in FIG. 7A.

In some embodiments, method 1550 may be performed in a similar manner as method 1500 and provided to identify fluid in an image of a video of a filling process. Method 1550 may begin at act 1552, in which a difference image between the image and a reference image in the video of a filling process is determined. In a non-limiting example, act 1552 may subtract a reference image preceding the image from the image. Similar to act 1502, the reference image in the video may be the first image in the filling process. In other examples, the reference image may the second, the third, or any image preceding the image in the video. The difference between acts 1502 and 1552 is that the orders of subtraction of images are reversed. This is because the filling component typically has low intensity pixels while fluid typically has high intensity pixels in the images. Thus, if the fluid is shown in bright color (e.g., high intensity), subtracting the reference image from the image will reveal high intensity pixels at where the fluid is located.

Figure 7C:
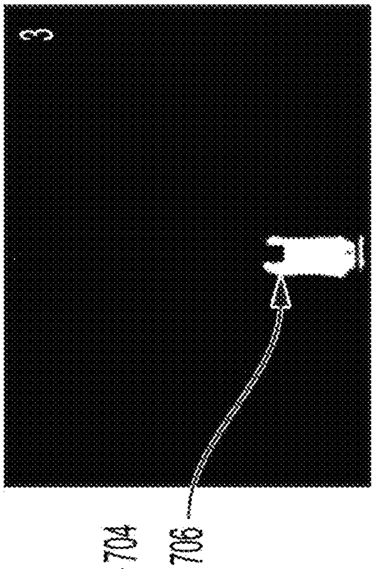

Method 1550 may proceed to act 1554 to determine edge pixels based on the subtracted image from act 1552. For example, act 1554 may binarize the subtracted image by a threshold. Optionally, before determining the edge pixels at act 1554, method 1550 may apply a filter, such as a bilateral filter to remove noise from the subtracted image while preserving the edge pixels. In some embodiments, these operations may also be performed in other orders. Method 1550 may continue to act 1556 of determining one or more bounded areas based on the edge pixels. In some embodiments, a bounded area may include connected edge pixels, such as, for example, 4-connected or 8-connected edge pixels. Various tracing algorithms may be used to find connected edge pixels. Once one or more bounded areas are determined, method 1550 may proceed to act 1558 of selecting a bounded area as the fluid. In some embodiment, act 1558 may determine, for each of the bounded areas, whether the size of the bounded area exceeds a respective threshold area for the fluid. In some examples, the threshold areas for selecting the filling component (in act 1508) and selecting the fluid (in act 1558) may be different, or may be the same. If the size of the bounded area exceeds the threshold area for the fluid, the method may select the bounded area as the identified fluid. In some embodiments, for a selected bounded area, the method may determine a bounding box of the identified fluid by determining a bounding box that is a minimum rectangular box encompassing the selected bounded area. An example is shown in FIG. 7C, where the edge pixels at high density show the detected fluid from the original image in FIG. 7A. As shown in FIGS. 15A and 15B, methods 1500 and 1550 are similar with the difference in subtraction steps 1502, 1552: in step 1502 (used for detecting the filling component), the image is subtracted from the reference image, whereas in step 1552 (used for detecting the fluid), the reference image is subtracted from the image. In some embodiments, the filling component may appear as dark pixels in video images (i.e., having low intensity levels). Therefore, subtracting the image from a previous reference image in the video (as described above for subtraction step 1502) will show movement and/or different placement of dark pixels (such as the filling component), allowing identification of the filling component. In some embodiments, the fluid may appear as bright pixels in video images (i.e., having high intensity levels). Therefore subtracting the previous reference image in the video from the image (as described above for subtraction step 1552) will show movement and/or different placement of bright pixels (such as the fluid), allowing identification of the fluid. It is appreciated that in other variations, the operations in 1502, 1552 may be adjusted accordingly, depending whether the filling component/fluid include dark/bright pixels in the image.

In some embodiments, variations of identifying the filling component and/or fluid in method 1500, 1550 may be possible. For example, in acts 1502, 1552, other variations may include binarizing the images before performing the subtraction of images. In other variations, the system may identify the filling component and/or fluid by selecting the bounded area that has the largest area among the multiple bounded areas, rather than selecting the bounded area that has an area above a threshold area.

Figure 16:
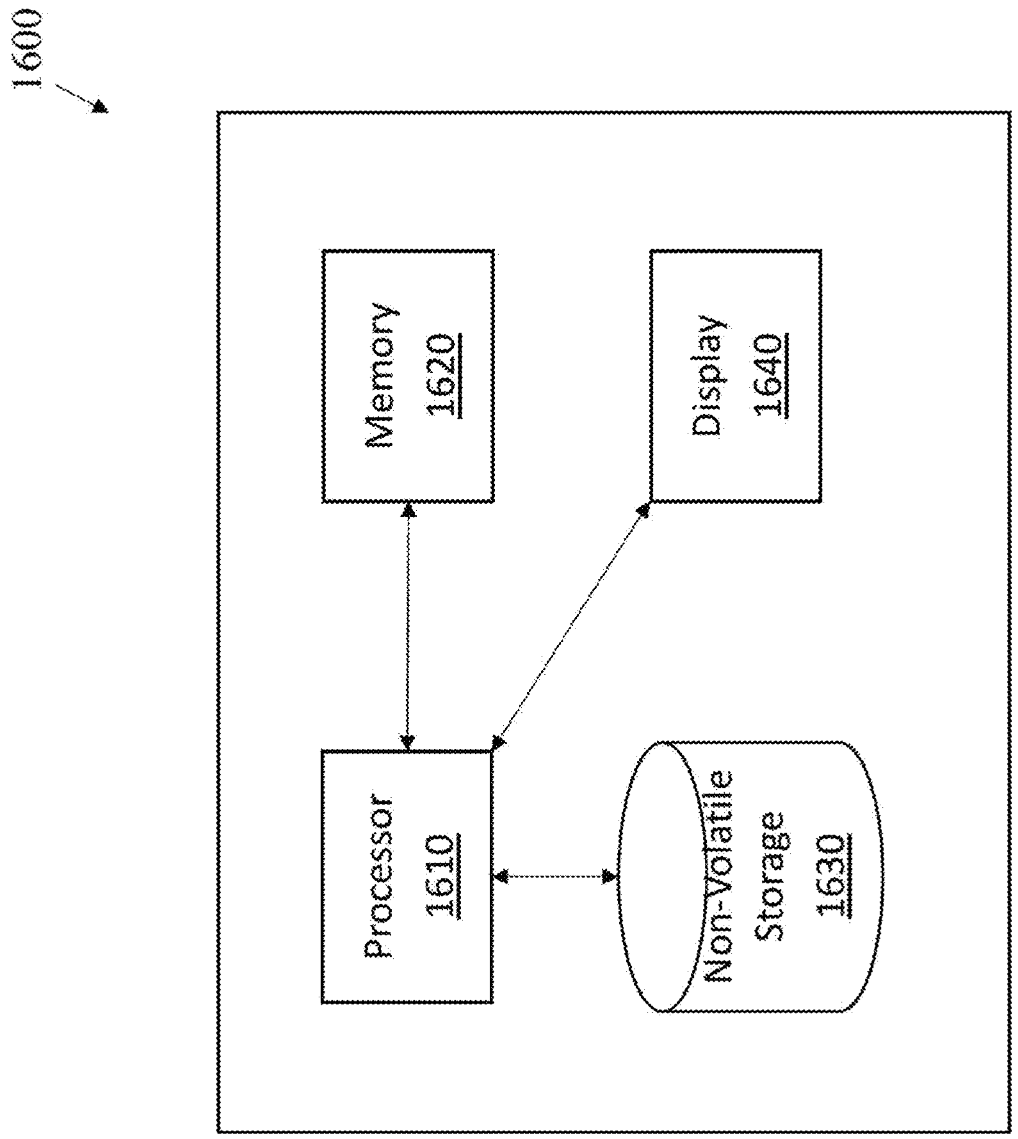
FIG. 16 shows an illustrative implementation of a computer system that may be used to perform any of the aspects of the techniques and embodiments disclosed herein, according to some embodiments.

An illustrative implementation of a computer system 1600 that may be used to perform any of the aspects of the techniques and embodiments disclosed herein is shown in FIG. 16. For example, the computer system 1600 may be installed in system 100 of FIG. 1, such as by server 110. The computer system 1600 may be configured to perform various methods and acts as described in FIGS. 10-15. The computer system 1600 may include one or more processors 1610 and one or more non-transitory computer-readable storage media (e.g., memory 1620 and one or more non-volatile storage media 1630) and a display 1640. The processor 1610 may control writing data to and reading data from the memory 1620 and the non-volatile storage device 1630 in any suitable manner, as the aspects of the invention described herein are not limited in this respect. In some embodiments, the computer system 1600 may also be a complete system on module (SOM), such as NVIDIA's Jetson module, which includes CPU, GPU, memory, and other components in a system. In some embodiments, the computer system 1600 may be located at any suitable site. For example, the computer system 1600 (e.g., server 110) may be co-located with the filling station 102 or may be on the network. In other variations, the system may not need to include a memory, but instead programming instructions are running on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for detecting various anomalies may be stored on one or more of those virtual machines on the cloud.

To perform functionality and/or techniques described herein, the processor 1610 may execute one or more instructions stored in one or more computer-readable storage media (e.g., the memory 1620, storage media, etc.), which may serve as non-transitory computer-readable storage media storing instructions for execution by the processor 1610.

In connection with techniques described herein, code used to, for example, detect anomalies in images/videos may be stored on one or more computer-readable storage media of computer system 1600. Processor 1610 may execute any such code to provide any techniques for detecting anomalies as described herein. Any other software, programs or instructions described herein may also be stored and executed by computer system 1600. It will be appreciated that computer code may be applied to any aspects of methods and techniques described herein. For example, computer code may be applied to interact with an operating system to detect anomalies through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

(1) A computerized method for detecting an anomaly in a filling process in which a container is filled with a fluid using a filling component, the method comprising: capturing a video of the container while the container is being filled with the fluid through the filling component; analyzing an image of the video using one or more processors to detect the anomaly, wherein the anomaly comprises one or more of a filling component submersion anomaly, a splash anomaly comprising a splash of fluid within the container, a drip anomaly comprising a drip of fluid within the container, or an unsafe filling component-fluid distance anomaly in which the filling component comes within an unsafe distance of a surface of the fluid in the container; and generating an alert indicative of the detected anomaly.

(2) The method of aspect 1, further comprising tuning a filling machine configured to fill the container with the fluid by altering, based on the detected anomaly, one or more parameters of the filling process that the filling machine is configured to perform.

(3) The method of any of aspects 1 or 2, further comprising: analyzing additional images of the video; and (i) determining the filling process has the filling component submersion anomaly if any of the image or the additional images is determined to show the filling component submersion anomaly; or (ii) determining the filling process has the splash anomaly if any of the image or the additional images is determined to show the splash anomaly; or (iii) determining the filling process has the unsafe filling component-fluid distance anomaly if: none of the image or the additional images is determined to show the filling component submersion anomaly; and at least one of the image or the additional images is determined to show a minimal vertical distance between the filling component and the fluid being less than a threshold distance.

(4) The method of any of aspects 1-3, wherein detecting the anomaly comprises: identifying the filling component in the image; identifying the fluid in the container in the image; and detecting the anomaly based on a relative position between the filling component and the fluid.

(5) The method of aspect 4, wherein: identifying the filling component comprises determining a first bounding box of the filling component; and identifying the fluid comprises determining a second bounding box of the fluid.

(6) The method of aspect 5, wherein detecting the anomaly comprises determining that the first bounding box of the filling component overlaps with the second bounding box of the fluid.

(7) The method of aspect 6, further comprising classifying the detected anomaly as the filling component submersion anomaly when a width of the second bounding box of the fluid is larger than a width of the first bounding box of the filling component by at least one of a threshold width ratio and a threshold width difference.

(8) The method of aspect 7, wherein detecting the anomaly further comprises determining that an elapsed time in the filling process is greater than a threshold filling time.

(9) The method of aspect 6, further comprising classifying the detected anomaly as the splash anomaly when a width of the second bounding box of the fluid is not larger than a width of the first bounding box of the filling component by at least one of a threshold width ratio and a threshold width difference.

(10) The method of aspect 5, further comprising classifying the detected anomaly as the splash anomaly when: the first bounding box of the filling component does not overlap with the second bounding box of the fluid; a minimal vertical distance between an edge of the first bounding box of the filling component and an edge of the second bounding box of the fluid is less than a first threshold distance; and a width of the second bounding box of the fluid is not larger than a width of the first bounding box of the filling component by a second threshold width difference.

(11) The method of any of aspects 9 or 10, wherein detecting the anomaly further comprises determining that an elapsed time in the filling process is less than a threshold filling time.

(12) The method of aspect 5, further comprising classifying the detected anomaly as the unsafe filling component-fluid distance anomaly when: the first bounding box of the filling component does not overlap with the second bounding box of the fluid; a minimal vertical distance between an edge of the first bounding box of the filling component and an edge of the second bounding box of the fluid is less than a first threshold vertical distance; and a width of the second bounding box of the fluid is larger than a width of the first bounding box of the filling component by a second threshold width difference.

(13) The method of any of aspects 1 or 2, further comprising: analyzing additional images of the video; and determining that the filling process has the splash anomaly if a number of images from the image and the additional images that have the splash anomaly exceeds a splash threshold.

(14) The method of any of aspects 1, 2 and 13, wherein detecting the anomaly comprises: identifying the filling component in the image; determining an area in the image proximate to the filling component; determining a fluid property in the image; and detecting the splash anomaly in the area based on the fluid property.

(15) The method of aspect 14, further comprising determining that the filling component has been completely inserted into the container before determining the area.

(16) The method of aspect 15, wherein determining that the filling component has been completely inserted into the container comprises: determining a filling component width of the filling component in the image and respective filling component widths of the filling component in one or more additional images preceding the image in the video; determining a variation of filling component width based on the filling component width in the image and the respective filling component widths in the one or more additional images preceding the image; and determining that the variation of filling component width is below a threshold filling component width.

(17) The method of aspect 16, wherein the variation of filling component width is a maximum width difference among the filling component width in the image and the respective filling component widths in the one or more additional images.

(18) The method of aspect 15, further comprising: determining that the filling process has started before determining that the filling component has been completely inserted into the container.

(19) The method of aspect 18, wherein determining that the filling process has started comprises: determining whether fluid is detected in the image; and if no fluid is detected, determining that the filling process has not started; otherwise, determining that the filling has started.

(20) The method of aspect 14, wherein the area comprises: a first area on a first side of the filling component; and a second area on a second side of the filling component opposite the first side.

(21) The method of any of aspects 14-20, wherein the fluid property comprises a slope in a surface of the fluid, and wherein detecting the splash anomaly in the area comprises: determining whether the slope exceeds a threshold; and if it is determined that the slope exceeds the threshold, detecting the splash anomaly in the area.

(22) The method of aspect 21, wherein determining the fluid property in the image comprises: determining fluid surface edge pixels in the area in the image; determining one or more fluid edges based on the fluid surface edge pixels; determining the slope based on a difference between a maximum vertical coordinate among the fluid surface edge pixels and a minimum vertical coordinate among the fluid surface edge pixels.

(23) The method of aspect 22, further comprising removing vertical edges from the fluid edges in the area in the image before determining the slope.

(24) The method of aspect 22, wherein determining the fluid surface edge pixels comprises applying a Canny operator to the area in the image.

(25) The method of aspects 1 or 2, further comprising: determining the filling process is nearing completion if a variation of height of the fluid in a number of consecutive images including the image of the video is below a threshold.

(26) The method of aspect 25, wherein: the image corresponds to a point in time when the filling process is nearing completion; and detecting the anomaly comprises: (i) identifying the filling component in the image; (ii) identifying the fluid in the container in the image; (iii) determining a distance between the filling component and the fluid; and (iv) detecting the unsafe filling component-fluid distance anomaly at the point in time when the filling process is nearing completion if it is determined that a distance between the filling component and the fluid is below a threshold distance.

(27) The method of aspect 26, wherein determining the distance between the filling component and the fluid comprises determining a vertical distance between closest edges of a bounding box of the filling component and a bounding box of the fluid.

(28) The method of any of aspects 1 or 2, further comprising: analyzing additional images of the video; and determining the filling process has the drip anomaly if any of the image or the additional images is determined to show the drip anomaly.

(29) The method of any aspects of 1, 2 and 28, wherein determining the anomaly comprises detecting the drip anomaly in the image by: providing the image to a trained neural network model; and using the trained neural network model to determine one of a plurality of classifications, wherein at least one of the plurality of classifications is indicative of the drip anomaly in the image.

(30) The method of aspect 29, wherein providing the image to the trained neural network model comprises: determining a portion of the image based on intensity of the image; and providing the portion of the image to the trained neural network model.

(31) The method of aspect 29, further comprising: (i) obtaining a plurality of training videos, wherein each training video of the plurality of training videos: captures an associated fluid filling process; and comprises a plurality of training images each labeled with one of the plurality of classifications; and (ii) training the neural network model using the plurality of training videos.

(32) The method of aspects 4, 14 or 26, wherein identifying the filling component or the fluid comprises: identifying edge pixels in the image; determining one or more bounded areas based on the edge pixels; and for each bounded area of the one or more bounded areas: (i) determining whether a size of the bounded area exceeds a respective threshold area for filling component or fluid; and (ii) if the size of the bounded area exceeds the respective threshold, selecting the bounded area as the filling component or the fluid.

(33) The method of aspect 32, wherein: identifying the edge pixels in the image comprises subtracting the image from a reference image preceding the image in the video to generate a subtracted image; and selecting the bounded area as the filling component comprises selecting the bounded area as the filling component based on the subtracted image.

(34) The method of aspect 32, wherein: identifying the edge pixels in the image comprises subtracting another image preceding the image in the video from the image to generate a subtracted image; and selecting the bounded area as the fluid comprises selecting the bounded area as the fluid based on the subtracted image.

(35) The method of any of aspects 33 or 34, wherein identifying the edge pixels comprises binarizing the subtracted image.

(36) The method of any of aspects 33 or 34, wherein identifying the edge pixels comprises: applying a bilateral filter to the subtracted image to generate a filtered subtracted image; and binarizing the filtered subtracted image.

(37) The method of aspect 32, further comprising generating a bounding box of the filling component or the fluid based on the bounded area, wherein the bounding box is a minimum rectangular that encompasses the bounded area.

(38) The method of aspects 4, 14 or 26, wherein identifying the filling component or the fluid comprises: generating a difference image between the image and a reference image in the video; determining one or more edges in the image based on the difference image; using the one or more edges to determine one or more bounded areas; and selecting a bounded area that has a largest area among the one or more bounded areas as the filling component or the fluid.

(39) The method of aspect 38, further comprising binarizing the image and the reference image before generating the difference image.

(40) The method of aspect 38, further comprising generating a bounding box of the filling component or the fluid based on the bounded area, wherein the bounding box is a minimum rectangular area that encompasses the bounded area.

(41) The method of aspect 38, wherein: determining the difference image comprises subtracting the image from a reference image in the video; and determining the bounded area as the filling component comprises determining the bounded area as the filling component based on the difference image.

(42) The method of aspect 38, wherein: determining the difference image comprises subtracting a reference image in the video from the image; and determining the bounded area as the fluid comprises determining the bounded area as the fluid based on the difference image.

(43) The method of any of aspects 1-42, wherein the fluid is a pharmaceutical fluid.

(44) The method of any of aspects 1-43, wherein the container is a transparent drug product container.

(45) A non-transitory computer-readable media comprising instructions that, when executed by one or more processors on a computing device, are operable to cause the one or more processors to execute the method of any of aspects 1-44.

(46) A system comprising: a filling machine configured to perform a filling process in which a container is filled with a fluid using a filling component; an image capturing device configured to capture a video of the container while the container is being filled with the fluid; and a processor configured to execute programming instructions to perform operations comprising any of aspects 1-44.

The invention claimed is:

1. A system for detecting an anomaly in a filling process in which a container is filled with a fluid using a filling component, the system comprising:

a filling machine configured to perform the filling process in which the container is filled with the fluid using the filling component;

an image capturing device configured to capture a video of the container while the container is being filled with the fluid; and one or more processors configured to execute programming instructions to:

receive from the image capturing device the captured video of the container while the container is being filled with the fluid through the filling component;

analyze an image of the video to detect the anomaly, wherein the anomaly comprises one or more of a filling component submersion anomaly, wherein the filling component submersion anomaly occurs when the filling component is submerged into the fluid during filling, or an unsafe filling component-fluid distance anomaly in which the filling component comes within an unsafe distance of a surface of the fluid in the container, and wherein detecting the anomaly comprises:

identifying the filling component in the image, identifying the fluid in the container in the image, and detecting the anomaly based on a relative position between the filling component and the fluid; and generate an alert indicative of the detected anomaly.

2. The system of claim 1, wherein the one or more processors are further configured to tune the filling machine by altering, based on the detected anomaly, one or more parameters of the filling process that the filling machine is configured to perform.

3. The system of claim 1, wherein:

identifying the filling component comprises determining a first bounding box of the filling component; and identifying the fluid comprises determining a second bounding box of the fluid.

4. The system of claim 3, wherein detecting the anomaly comprises determining that the first bounding box of the filling component overlaps with the second bounding box of the fluid.

5. The system of claim 4, wherein the one or more processors are further configured to classify the detected anomaly as the filling component submersion anomaly when a width of the second bounding box of the fluid is larger than a width of the first bounding box of the filling component by at least one of a threshold width ratio and a threshold width difference.

6. The system of claim 3, wherein the one or more processors are further configured to classify the detected anomaly as a splash anomaly when:

the first bounding box of the filling component does not overlap with the second bounding box of the fluid;

a minimal vertical distance between an edge of the first bounding box of the filling component and an edge of the second bounding box of the fluid is less than a first threshold distance; and a width of the second bounding box of the fluid is not larger than a width of the first bounding box of the filling component by a second threshold width difference.

7. The system of claim 3, wherein the one or more processors are further configured to classify the detected anomaly as the unsafe filling component-fluid distance anomaly when:

the first bounding box of the filling component does not overlap with the second bounding box of the fluid;

a minimal vertical distance between an edge of the first bounding box of the filling component and an edge of the second bounding box of the fluid is less than a first threshold vertical distance; and a width of the second bounding box of the fluid is larger than a width of the first bounding box of the filling component by a second threshold width difference.

8. The system of claim 1, wherein detecting the anomaly comprises:

identifying the filling component in the image;

determining an area in the image proximate to the filling component;

determining a fluid property in the image; and detecting a splash anomaly in the area based on the fluid property.

9. The system of claim 8, wherein the one or more processors are further configured to determine that the filling component has been completely inserted into the container before determining the area.

10. The system of claim 9, wherein determining that the filling component has been completely inserted into the container comprises:

determining a filling component width of the filling component in the image and respective filling component widths of the filling component in one or more additional images preceding the image in the video;

determining a variation of filling component width based on the filling component width in the image and the respective filling component widths in the one or more additional images preceding the image; and determining that the variation of filling component width is below a threshold filling component width.

11. The system of claim 9, wherein the one or more processors are further configured to determine that the filling process has started before determining that the filling component has been completely inserted into the container, wherein determining that the filling process has started comprises:

determining whether fluid is detected in the image; and if no fluid is detected, determining that the filling process has not started; otherwise, determining that the filling process has started.

12. The system of claim 8, wherein the area comprises:

a first area on a first side of the filling component; and a second area on a second side of the filling component opposite the first side.

13. The system of claim 8, wherein the fluid property comprises a slope in a surface of the fluid, and wherein detecting the splash anomaly in the area comprises:
determining whether the slope exceeds a threshold; and
if it is determined that the slope exceeds the threshold, detecting the splash anomaly in the area.

14. The system of claim 13, wherein determining the fluid property in the image comprises:
determining fluid surface edge pixels in the area in the image;
determining one or more fluid edges based on the fluid surface edge pixels; and
determining the slope based on a difference between a maximum vertical coordinate among the fluid surface edge pixels and a minimum vertical coordinate among the fluid surface edge pixels.

15. The system of claim 14, wherein the one or more processors are further configured to remove vertical edges from the fluid edges in the area in the image before determining the slope.

16. The system of claim 1, wherein the one or more processors are further configured to:
determining the filling process is nearing completion if a variation of height of the fluid in a number of consecutive images including the image of the video is below a threshold, wherein: the image corresponds to a point in time when the filling process is nearing completion; and
detecting the anomaly comprises:
identifying the filling component in the image;
identifying the fluid in the container in the image;
determining a distance between the filling component and the fluid; and
detecting the unsafe filling component-fluid distance anomaly at the point in time when the filling process is nearing completion if it is determined that the distance between the filling component and the fluid is below a threshold distance.

17. The system of claim 1, wherein determining the anomaly comprises detecting a drip anomaly in the image by:
providing the image to a trained neural network model; and
using the trained neural network model to determine one of a plurality of classifications, wherein at least one of the plurality of classifications is indicative of the drip anomaly in the image.

18. The system of claim 17, wherein the one or more processors are further configured to:
obtain a plurality of training videos, wherein each training video of the plurality of training videos:
captures an associated fluid filling process; and
comprises a plurality of training images each labeled with one of the plurality of classifications; and
training the neural network model using the plurality of training videos.

19. The system of claim 1, wherein identifying the filling component or the fluid comprises:
identifying edge pixels in the image;
determining one or more bounded areas based on the edge pixels; and
for each bounded area of the one or more bounded areas:
determining whether a size of the bounded area exceeds a respective threshold area for the filling component or the fluid; and
if the size of the bounded area exceeds the respective threshold area, selecting the bounded area as the filling component or the fluid.

20. The system of claim 19, wherein:
identifying the edge pixels in the image comprises subtracting the image from a reference image preceding the image in the video to generate a subtracted image.

21. The system of claim 19, wherein the one or more processors are further configured to generate a bounding box of the filling component or the fluid based on the bounded area, wherein the bounding box is a minimum rectangular area that encompasses the bounded area.

22. The system of claim 1, wherein identifying the filling component or the fluid comprises:
generating a difference image between the image and a reference image in the video;
determining one or more edges in the image based on the difference image;
using the one or more edges to determine one or more bounded areas; and
selecting a bounded area that has a largest area among the one or more bounded areas as the filling component or the fluid.

23. The system of claim 1, wherein the fluid is a pharmaceutical fluid, and the container is a transparent drug product container.

* * * * *